(12) United States Patent
Denmon et al.

(10) Patent No.: US 12,714,093 B2
(45) **Date of Patent: *Aug. 25, 2026**

(54) ANIMAL DECOYS AND METHODS FOR USING SAME

(71) Applicant: Huntwise, Inc., Monroe, LA (US)

(72) Inventors: Terry Denmon, Monroe, LA (US); Charles L. Smart, Monroe, LA (US); Bradley Smith, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,534

(22) Filed: Jan. 28, 2025

(65) Prior Publication Data

US 2025/0241293 A1 Jul. 31, 2025

Related U.S. Application Data

(63) Continuation of application No. 18/125,521, filed on Mar. 23, 2023, now Pat. No. 12,239,122.

(51) Int. Cl.
*A01M 31/06* (2006.01)

(52) U.S. Cl.
CPC .................................. *A01M 31/06* (2013.01)

(58) Field of Classification Search
CPC .................................................... A01M 31/06
USPC ................................................................ 43/3
See application file for complete search history.

(56) References Cited

U.S. PATENT DOCUMENTS

| | | | | |
|---|---|---|---|---|
| 4,612,722 A | 9/1986 | Ferrell | | |
| 5,289,654 A | 3/1994 | Denny | | |
| 5,459,958 A | 10/1995 | Reinke | | |
| 6,412,210 B1 | 7/2002 | Horrell | | |
| 11,083,189 B1 | 8/2021 | Baskfield | | |
| 11,602,145 B1 | 3/2023 | Higdon | | |
| 12,239,122 B2 * | 3/2025 | Denmon | ............... | A01M 31/06 |
| 12,302,891 B1 * | 5/2025 | Noe | ...................... | A01M 31/06 |
| 2009/0188148 A1 | 7/2009 | Orris et al. | | |
| 2016/0309704 A1 | 10/2016 | Young | | |
| 2020/0008418 A1 | 1/2020 | Peoples | | |
| 2020/0146279 A1 | 5/2020 | Young | | |
| 2021/0141379 A1 | 5/2021 | Deloach, III | | |
| 2021/0186003 A1 | 6/2021 | Denmon | | |
| 2021/0274775 A1 | 9/2021 | Cagle | | |
| 2023/0263154 A1 | 8/2023 | Denmon | | |

(Continued)

*Primary Examiner* — Christopher P Ellis
(74) *Attorney, Agent, or Firm* — Kean Miller LLP; Robert Devin Ricci; Lauren J. Rucinski

(57) ABSTRACT

Disclosed herein are animal decoys for hunting, birdwatching, photographing, and other outdoor activities. In a specific embodiment, the animal decoy includes: a hinge; a housing unit, where the housing unit includes a head section, a tail section, and an interior space; an electric motor; a switch, where the switch is operative connected to the electric motor; an electric motor housing; a battery housing; at least one wing member attachment member; at least one wing member, where the at least one wing member is attached to the at least one wing member attachment member; a drive shaft, wherein the drive shaft is operative connected to the electric motor and the at least one wing member attachment member; a mounting member; a support member; a coupling member; where the coupling member is attached to the battery housing at a first end and the electric motor housing at a second end.

20 Claims, 17 Drawing Sheets

(56) References Cited

U.S. PATENT DOCUMENTS

2023/0292740 A1 9/2023 Parker
2023/0397601 A1 12/2023 Boyd

* cited by examiner

ANIMAL DECOYS AND METHODS FOR USING SAME

CROSS-REFERENCE TO RELATED APPLICATIONS

This application is a continuation of U.S. Nonprovisional application Ser. No. 18/125,521 entitled "ANIMAL DECOYS AND METHODS FOR USING SAME" filed on 23 Mar. 2023. The disclosures of that application are incorporated in full by references as if copied herein.

BACKGROUND

Field

Disclosed herein are animal decoys and methods for using them to attract animals to a location. The animal decoys include moving appendages controlled by an electric motor, which give the animal decoys a realistic presentation.

Description of the Related Art

Outdoor enthusiasts, recreational hunters, and wildlife photographers have long recognized that live animals and game, particularly waterfowl, are attracted to areas that appear to be inhabited by similar animals. For this reason, people have used decoys to attract live game to a shooting distance of a hunter's gun or a prime viewing distance of a photographer's camera. However, animal decoys presently available on the market can have drawbacks. For example, stationary decoys can give the appearance of birds sitting on the water, but they are not particularly noticeable on their own from the perspective of a flying bird at a distance. Therefore, animal decoys that have moving parts have been created to attract animals, such as those in U.S. Pat. Nos. 6,508,028 and 6,079,140. While these motion decoys have shown success in the past, they can also have drawbacks, such as an artificial appearance, which limits their success at attracting animals. For example, current motion decoys can have their moving components attached to the body of the decoy, which can produce unnatural vibrations and excessive noise, leading many animals to learn to become "decoy-wise."

Consequently, there is need for new animal decoys that have moving appendages that can give a realistic presentation without producing unnatural vibrations and noise. One or more embodiments of the present invention provide such features.

SUMMARY

Provided herein are animal decoys and methods for using them to attract wildlife. In a specific embodiment, an animal decoy includes: a hinge, where the hinge includes a first leaf, a second leaf, a knuckle, and a pin; a housing unit, where the housing unit includes a head section, a tail section, and an interior space, where the head section includes blow-molded plastic, and where the head section includes a head shape of an avian animal, where the tail section includes blow-molded plastic, where the tail section includes a tail shape of an avian animal, where the head section is attached to the first leaf of the hinge, and where the tail section is attached to the second leaf of the hinge; an electric motor; a switch, where the switch is operative connected to the electric motor; an electric motor housing; a battery housing; at least one wing member attachment member; at least one wing member, where the at least one wing member is attached to the at least one wing member attachment member; a drive shaft, where the drive shaft is operative connected to the electric motor and the at least one wing member attachment member; a mounting member; and a support member.

In another specific embodiment, an animal decoy includes a coupling member, where the coupling member is attached to a battery housing at a first end and an electric motor housing at a second end.

In another specific embodiment, the decoy body may comprise a recess in the base of the decoy body. The recess may be shaped to correspond to a shape of at least a portion of a mounting member to position and hold the mounting member to the decoy body. The mounting member may be coupled to a coupling member, either directly or indirectly, thereby coupling the motor to the mounting member. The mounting member may be attached to the decoy via mechanical fasteners, such as screws. The mechanical fasteners may connect the mounting member, the decoy body, and the coupling member. In operation, the motor will cause a vibrational effect. By coupling the motor to the mounting member itself, the vibrational effect may be transferred to the support structure or member, reducing vibrational discharge on the decoy body. Further, the recess may help secure the mounting member in place, allowing for greater force distribution.

In another specific embodiment, the coupling member couples the motor to the external support structure in a manner that reduces vibrational effect of the motor. In another specific embodiment, the motor is not attached directly to the decoy body to reduce the transfer of vibration onto the body.

In yet another specific embodiment, a method of using the animal decoy includes placing the animal decoy in nature and activating the electric motor to engage the wing members.

BRIEF DESCRIPTION OF THE DRAWINGS

The present disclosure can be better understood by referring to the following drawings. The drawings constitute a part of this specification and include exemplary embodiments of the animal decoy, which may be embodied in various forms.

DETAILED DESCRIPTION

In one or more embodiments, the animal decoy can include, but are not limited to: one or more housing units, one or more head sections, one or more anterior sections, one or more tail sections, one or more posterior sections, one or more body sections, one or more openings, one or more outer surfaces, one or more inner surfaces, one or more interior spaces, one or more recesses, one or more door members, one or more electric motors, one or more wing members, one or more wing member attachment members, one or more drive shafts, one or more axles, one or more feet members, one or more mounting members, one or more support members, one or more electric motor housings, one or more battery housings, one or more coupling members, one or more electrical wires, one or more loop members, one or more clips, one or more remote controllers, one or more remote controller housings, one or more receivers, one or more transmitters, one or more transceivers, one or more switches, one or more timers, one or more printed circuit boards, one or more processors, one or more memory, one or more joints, one or more hinges, one or more latch members, one or more screws, one or more screw holes, and one or more bungee cords. The animal decoy can include a length, height, width, thickness, radius, first end, front side, second end, back side, right side, left side, top side, bottom side, outer surface, inner surface, and interior space. The animal decoy can include, but are not limited to: avian decoys, waterfowl decoys, duck decoys, mallard decoys, quail decoys, dove decoys, pigeon decoys, hawk decoys, and other animal decoys. Each of the listed components of the animal decoy can include, but are not limited to: plastic, elastomer, metal, alloy, ceramic, glass, wood, rubber, fiber, and combinations thereof. Each of the listed components of the animal decoy can be made by blow molding plastic, such as extrusion blow molding, injection blow molding, and injection stretch blow molding.

Figure 1:
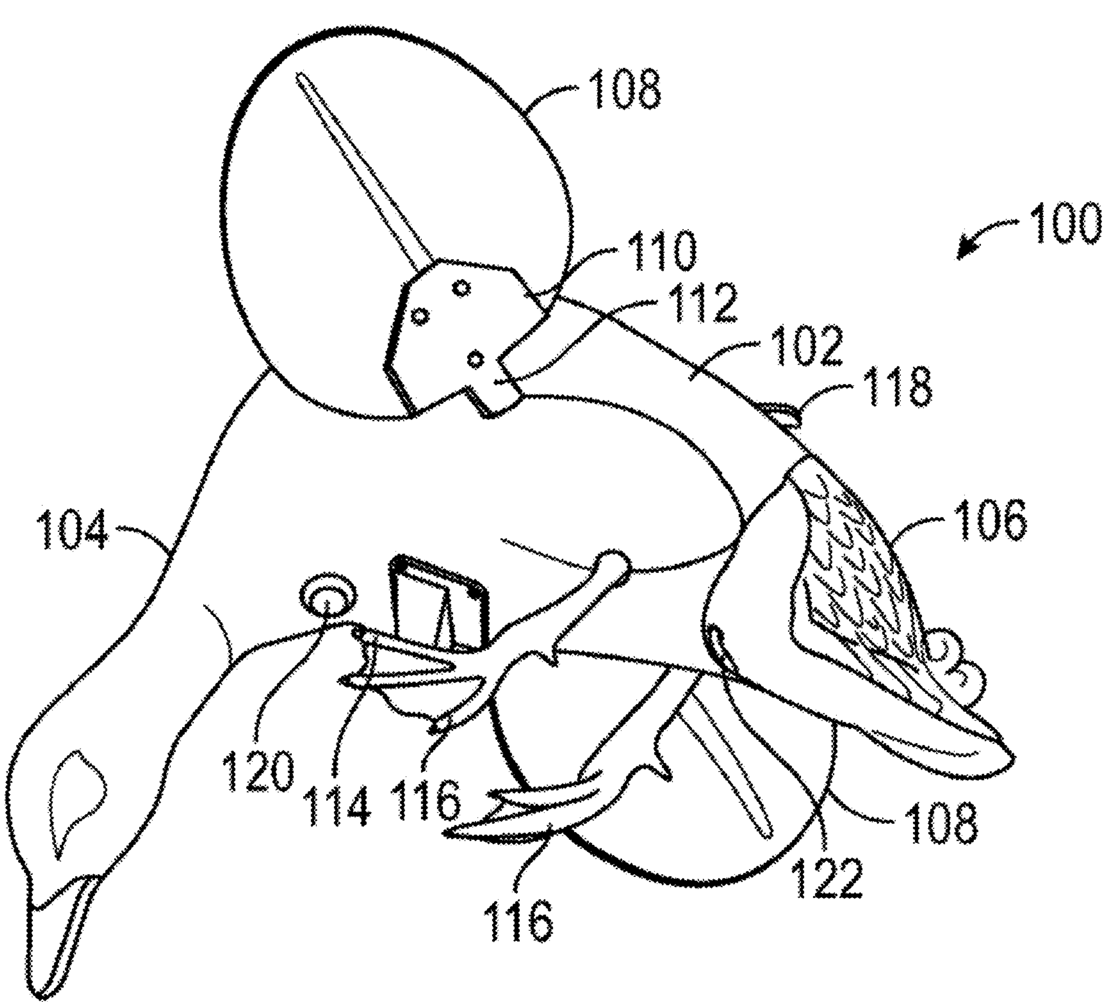
FIG. 1 shows a left side view of an embodiment of an animal decoy 100.
Figure 2:
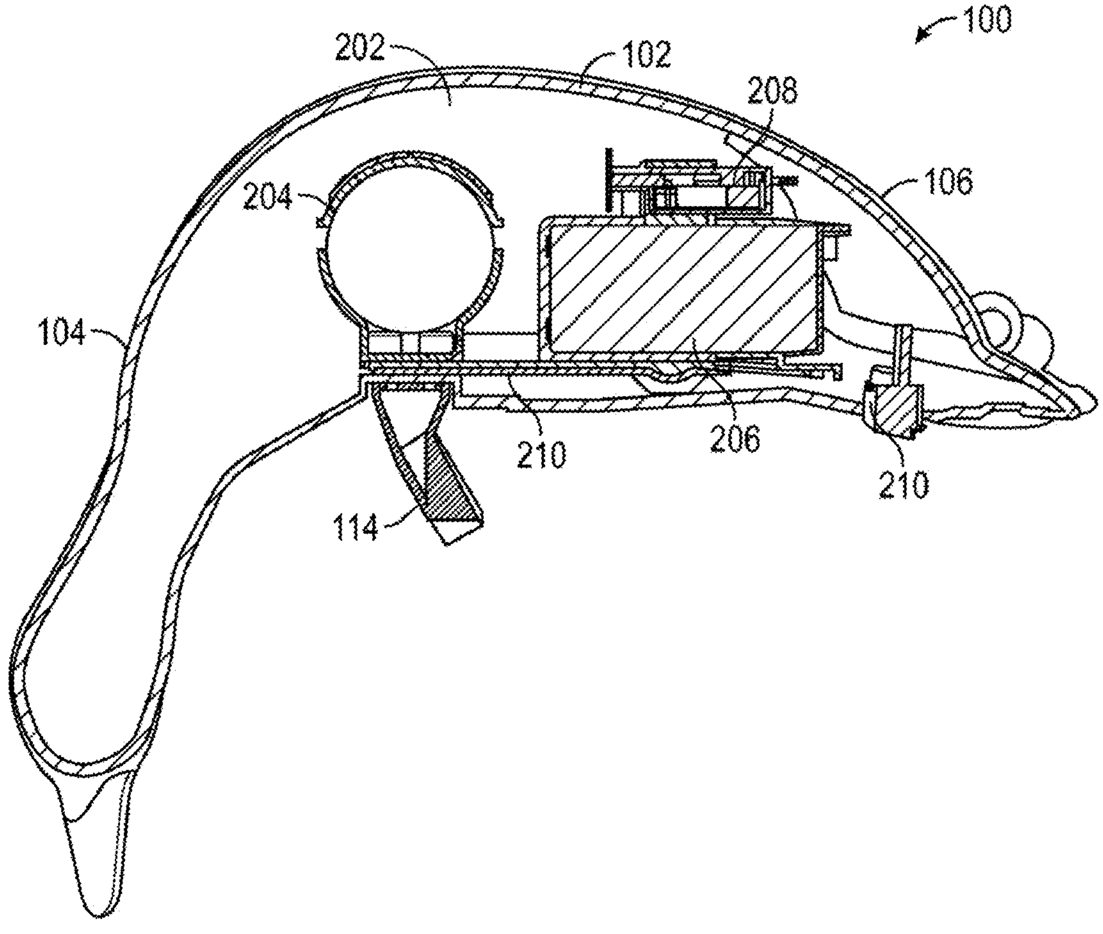
FIG. 2 shows a cross-sectional side view of an embodiment of the animal decoy 100.
Figure 3:
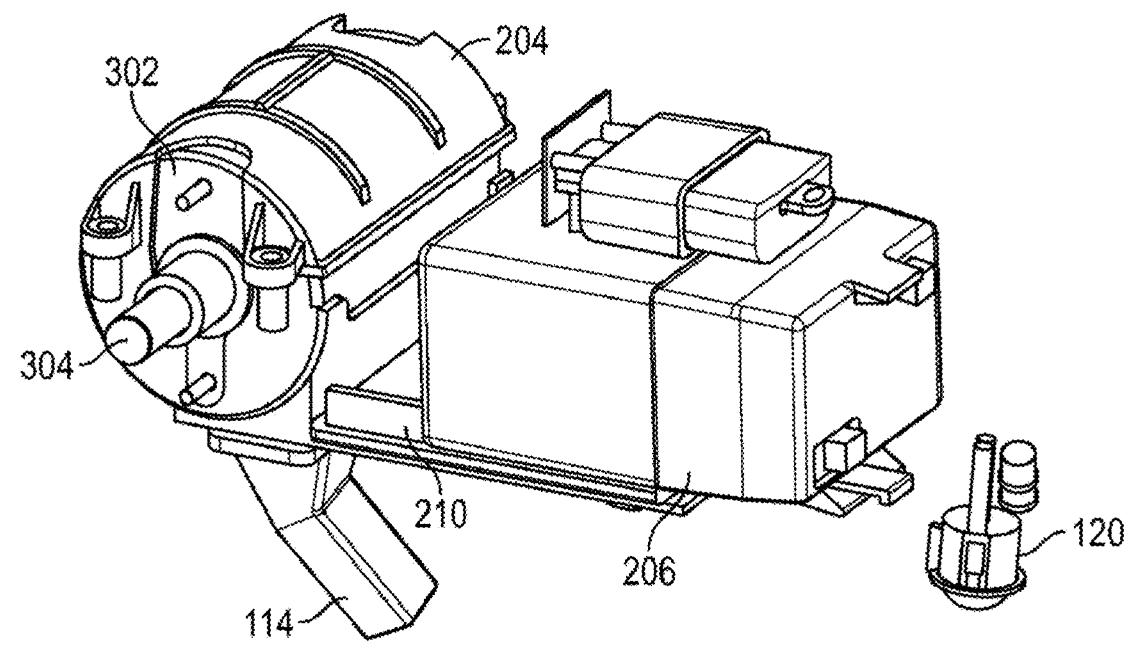
FIG. 3 shows a side view of an electric motor housing 204, electric motor 302, battery housing 206, remote controller housing 208, coupling member 210, mounting member 114, and switch 120 of an embodiment of the animal decoy 100.
Figure 4:
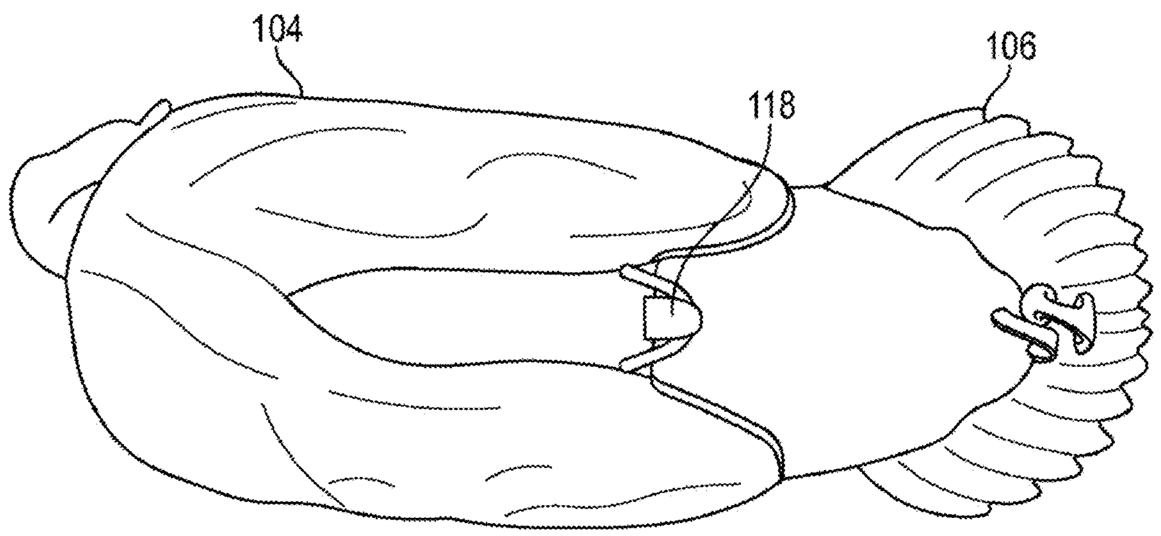
FIG. 4 shows a top view of an embodiment of an animal decoy 100.
Figure 5:
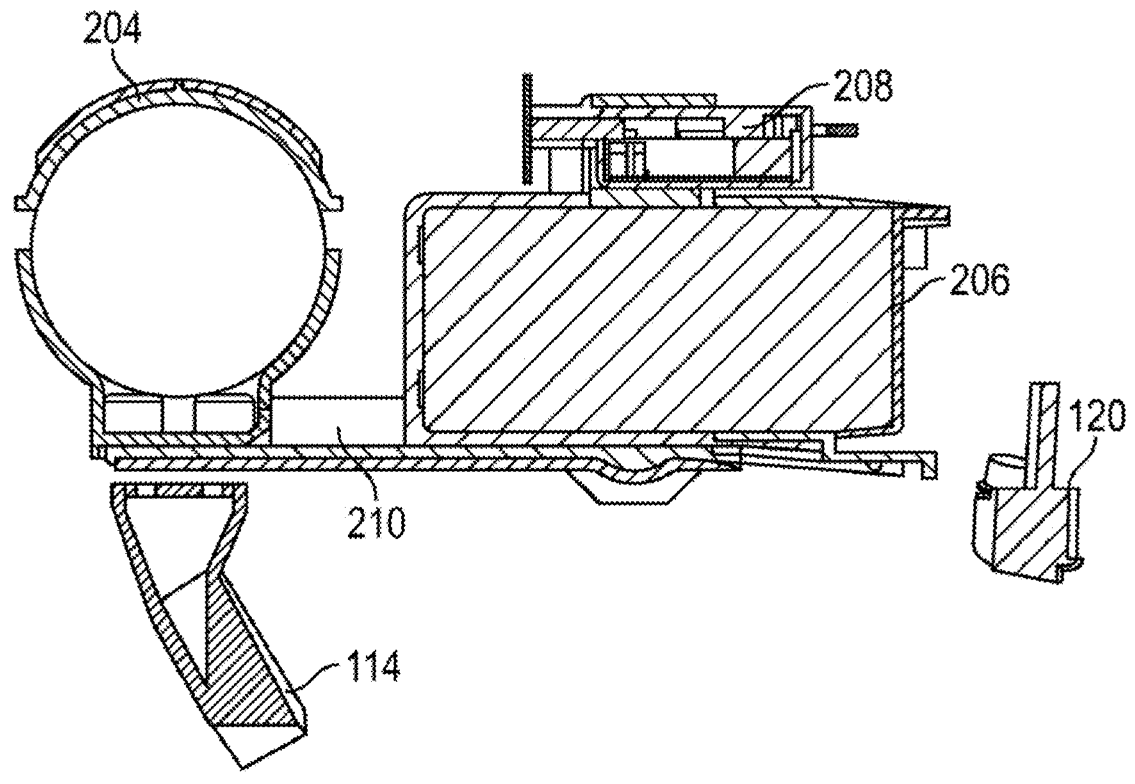
FIG. 5 shows a cross-sectional side view of an electric motor housing 204, electric motor 302, battery housing 206, remote controller housing 208, coupling member 210, mounting member 114, and switch 120 of an embodiment of the animal decoy 100.
Figure 6:
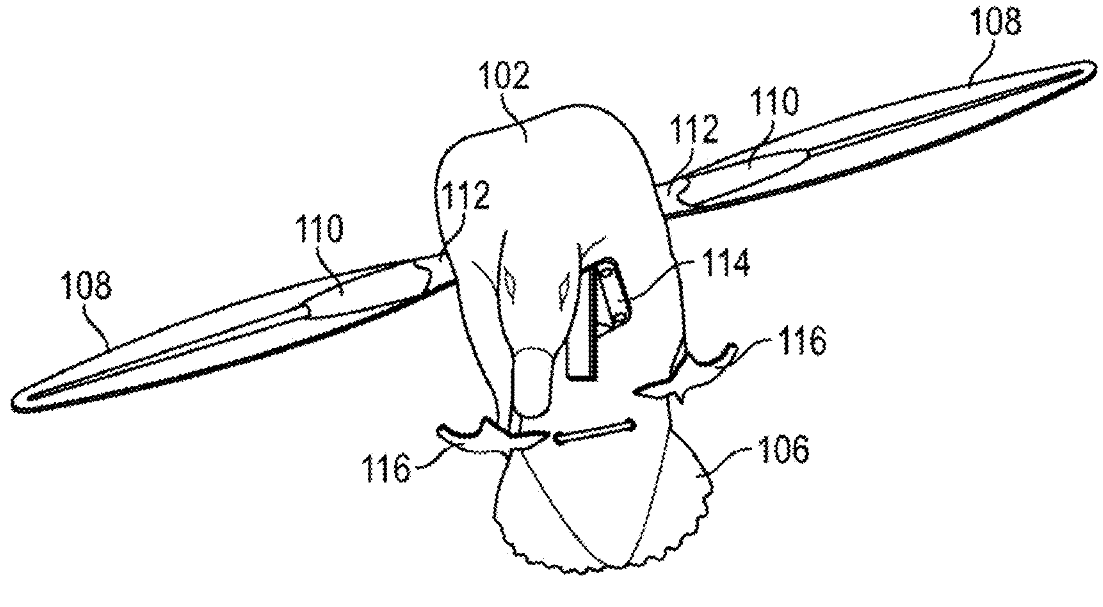
FIG. 6 shows a front view disclosing an embodiment of a head section 104 of the animal decoy 100.
Figure 7A:
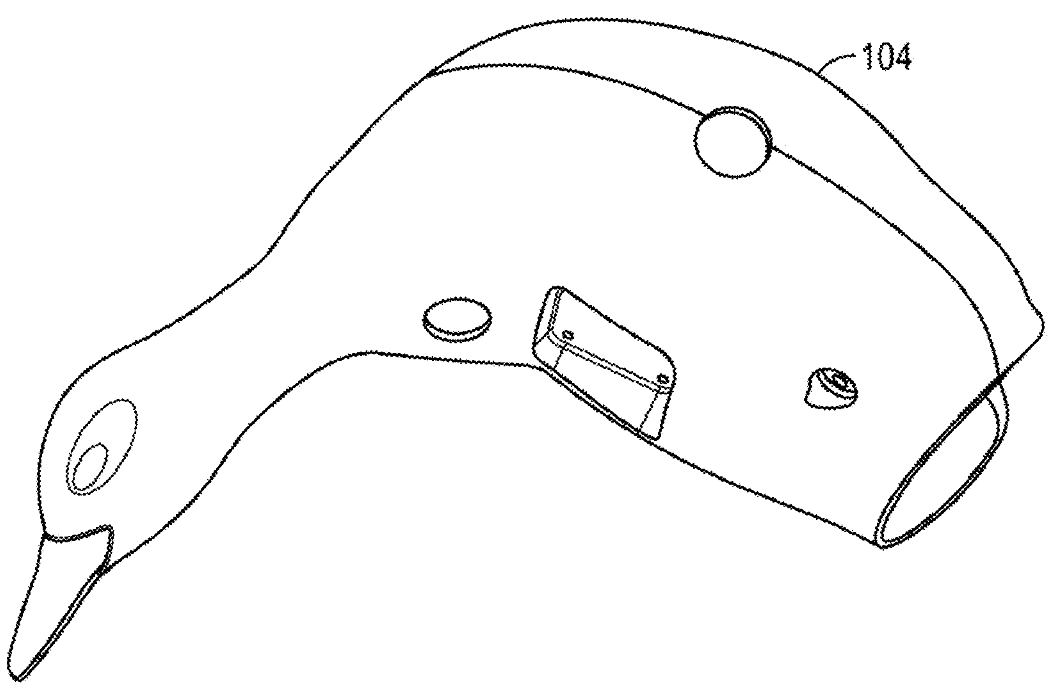
FIGS. 7A-7-B show a perspective bottom view of an embodiment of the animal decoy 100.
Figure 7B:
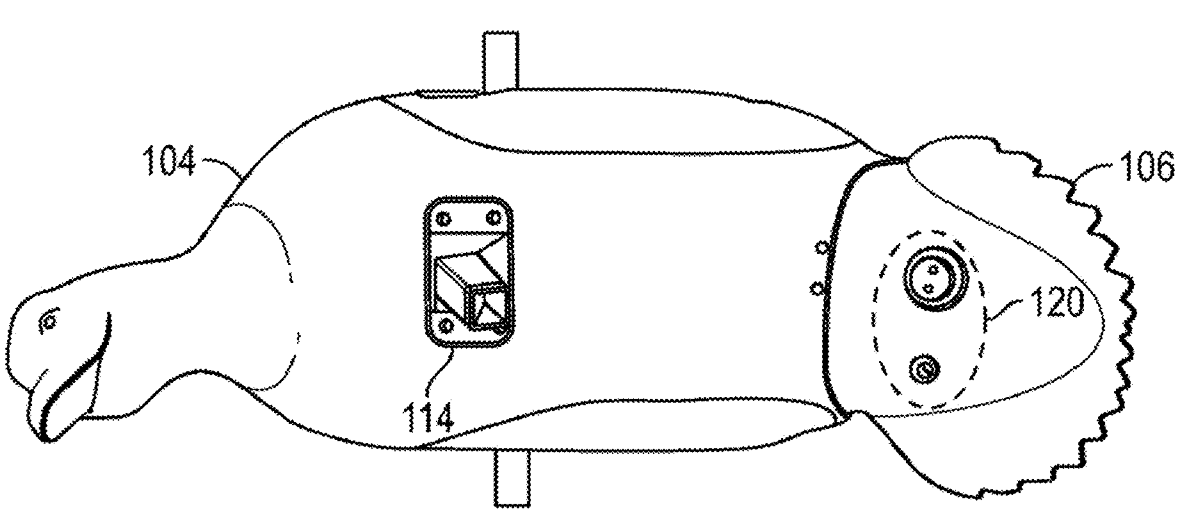
Figure 8:
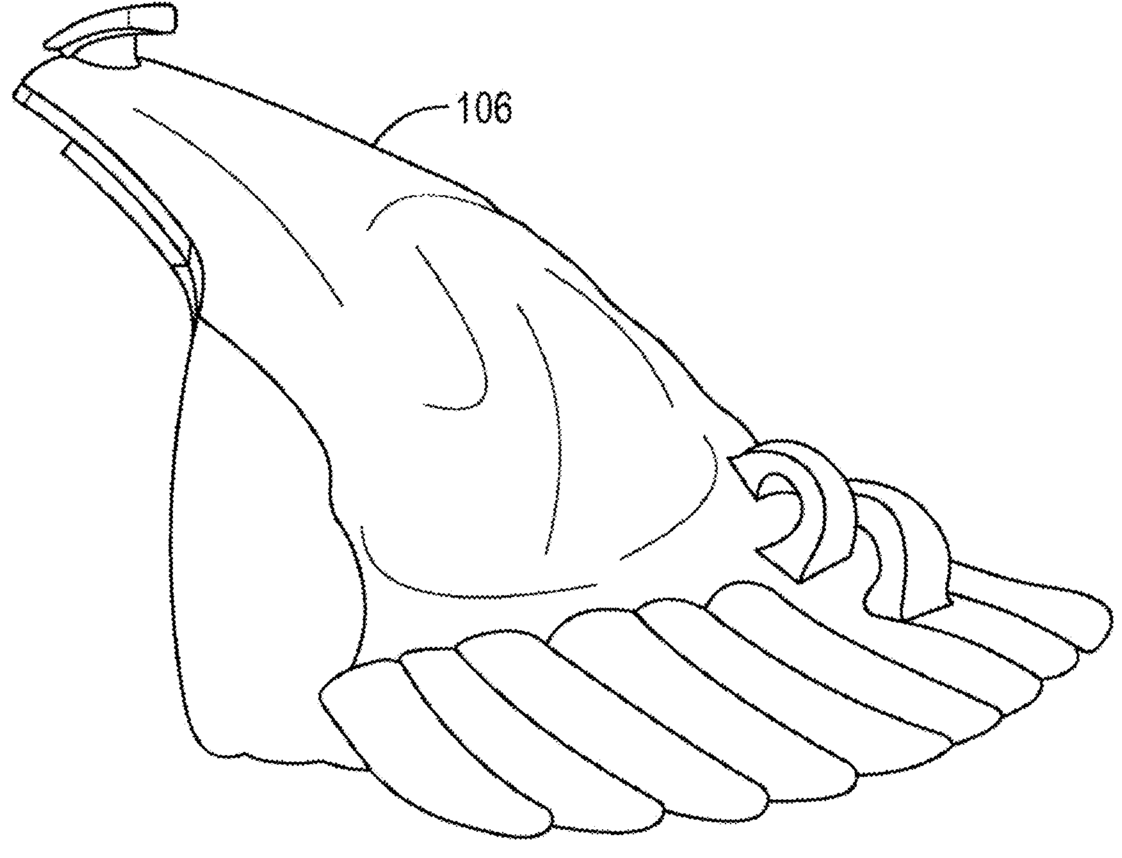
FIG. 8 shows an embodiment of a tail section 106 of the animal decoy 100.
Figure 9:
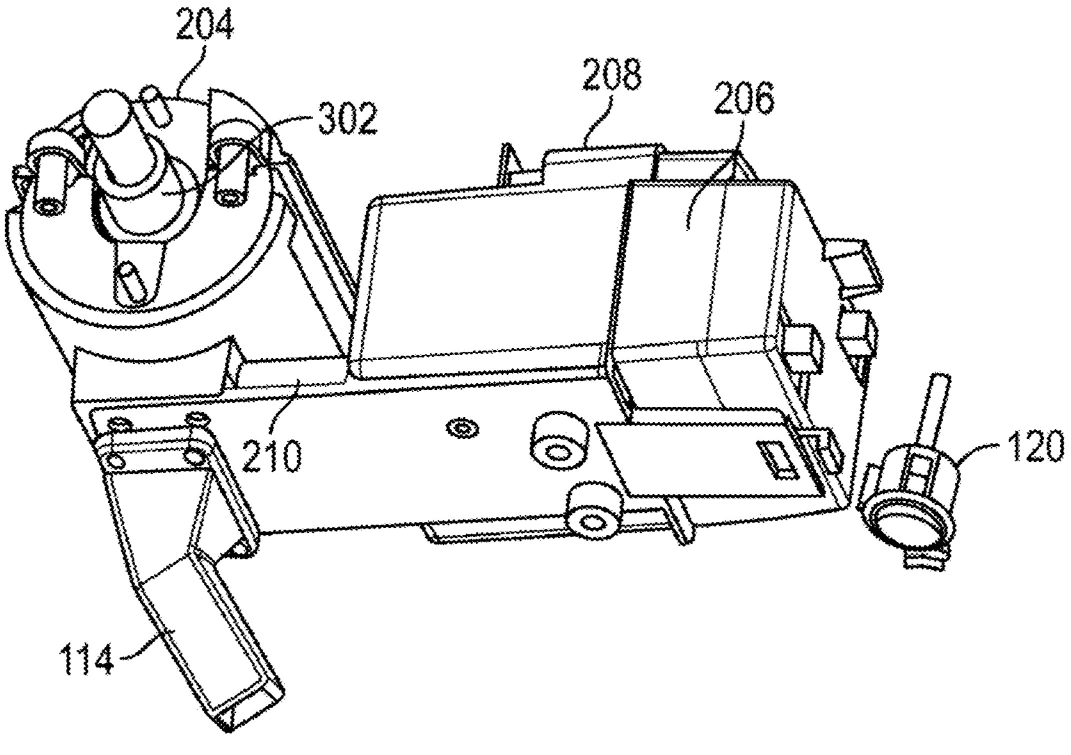
FIG. 9 shows a side view of the electric motor housing 204, electric motor 302, battery housing, remote controller housing 208, remote controller, coupling member 210, mounting member 114, and switch 120 of an embodiment of the animal decoy 100.
Figure 10:
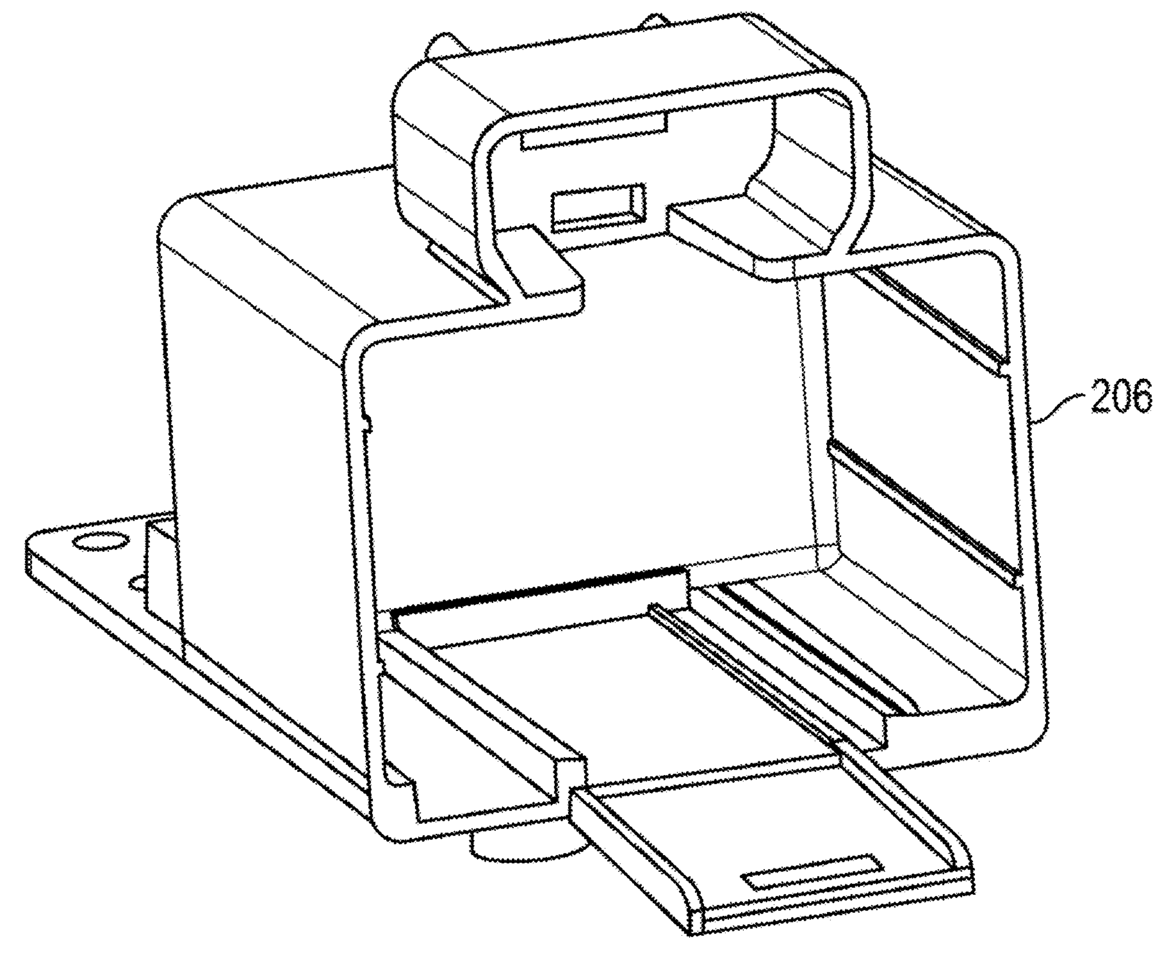
FIG. 10 shows a view battery housing 206 and remote controller housing 208.
Figure 11:
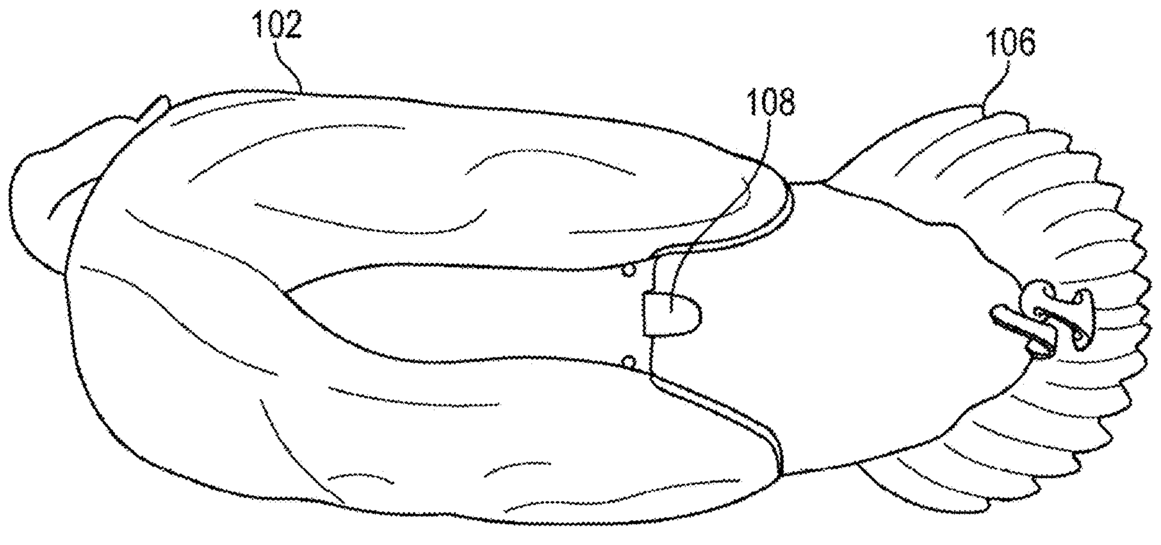
FIG. 11 shows a top view of a housing unit 102 of an embodiment of the animal decoy 100.
Figure 12:
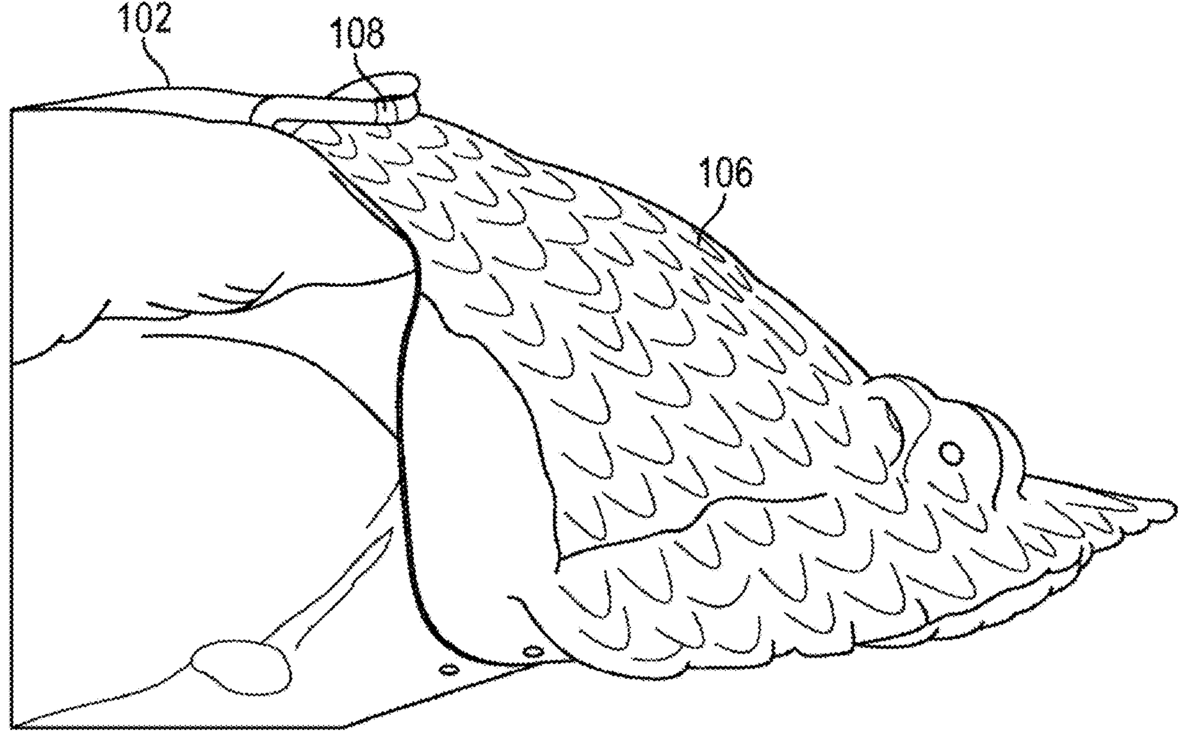
FIG. 12 shows a side view of the housing unit 102, including tail section 106 and connector strap 119.
Figure 13:
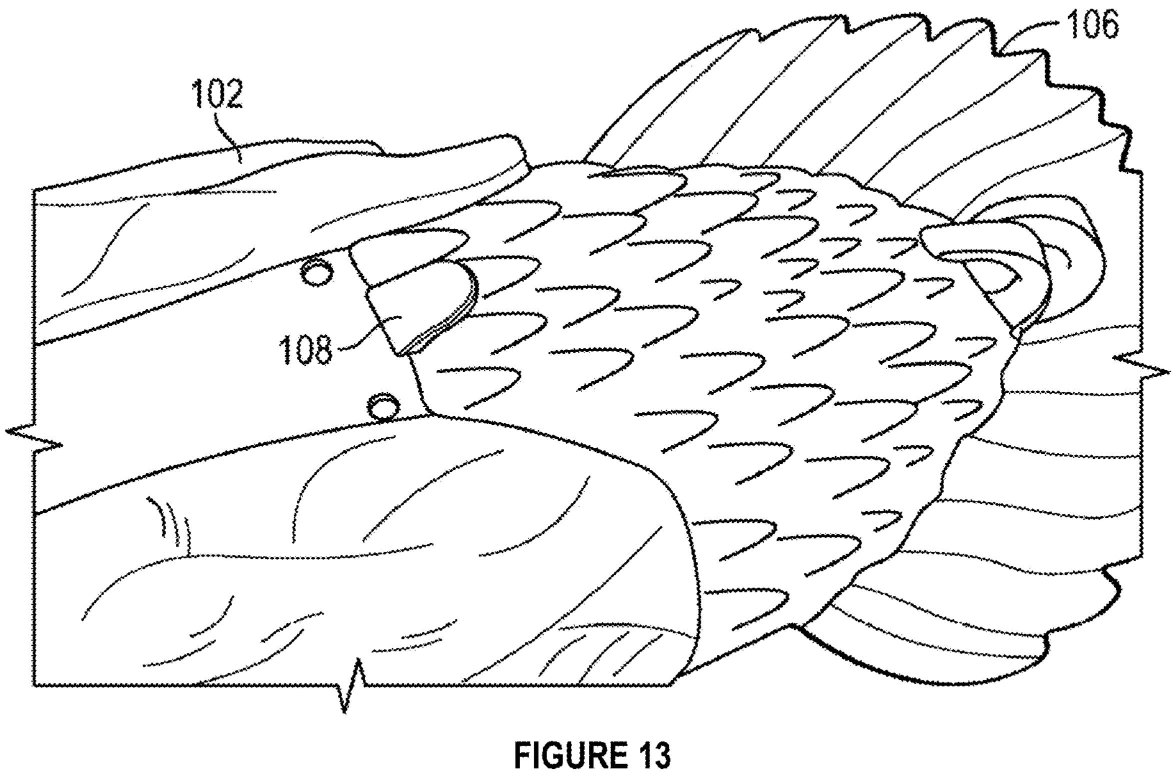
FIG. 13 shows a top view of a housing unit 102 of an embodiment of the animal decoy 100 without the connector strap 119.
Figure 14:
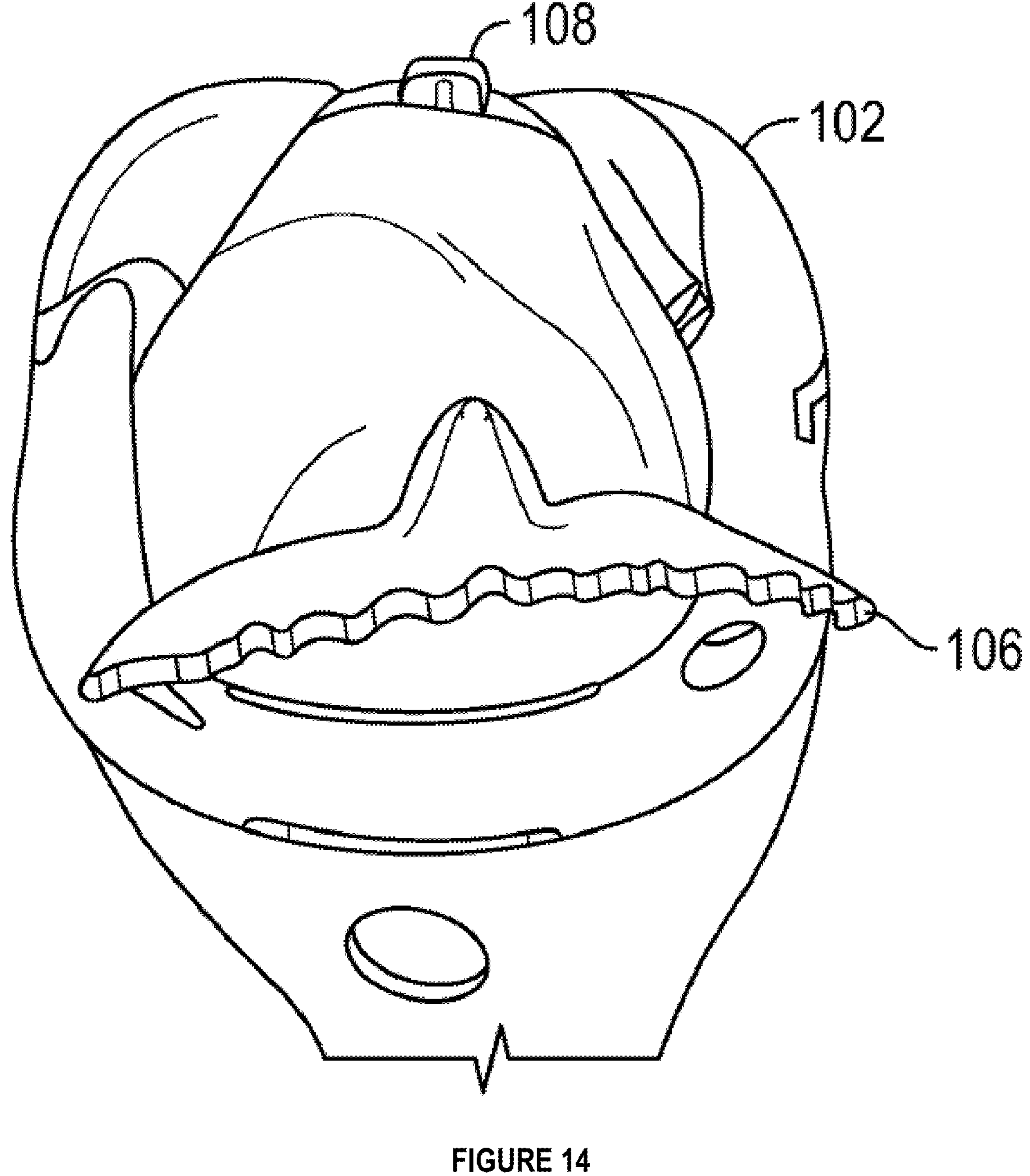
FIG. 14 shows a back view of a housing unit 102 of an embodiment of the animal decoy 100.
Figure 15:
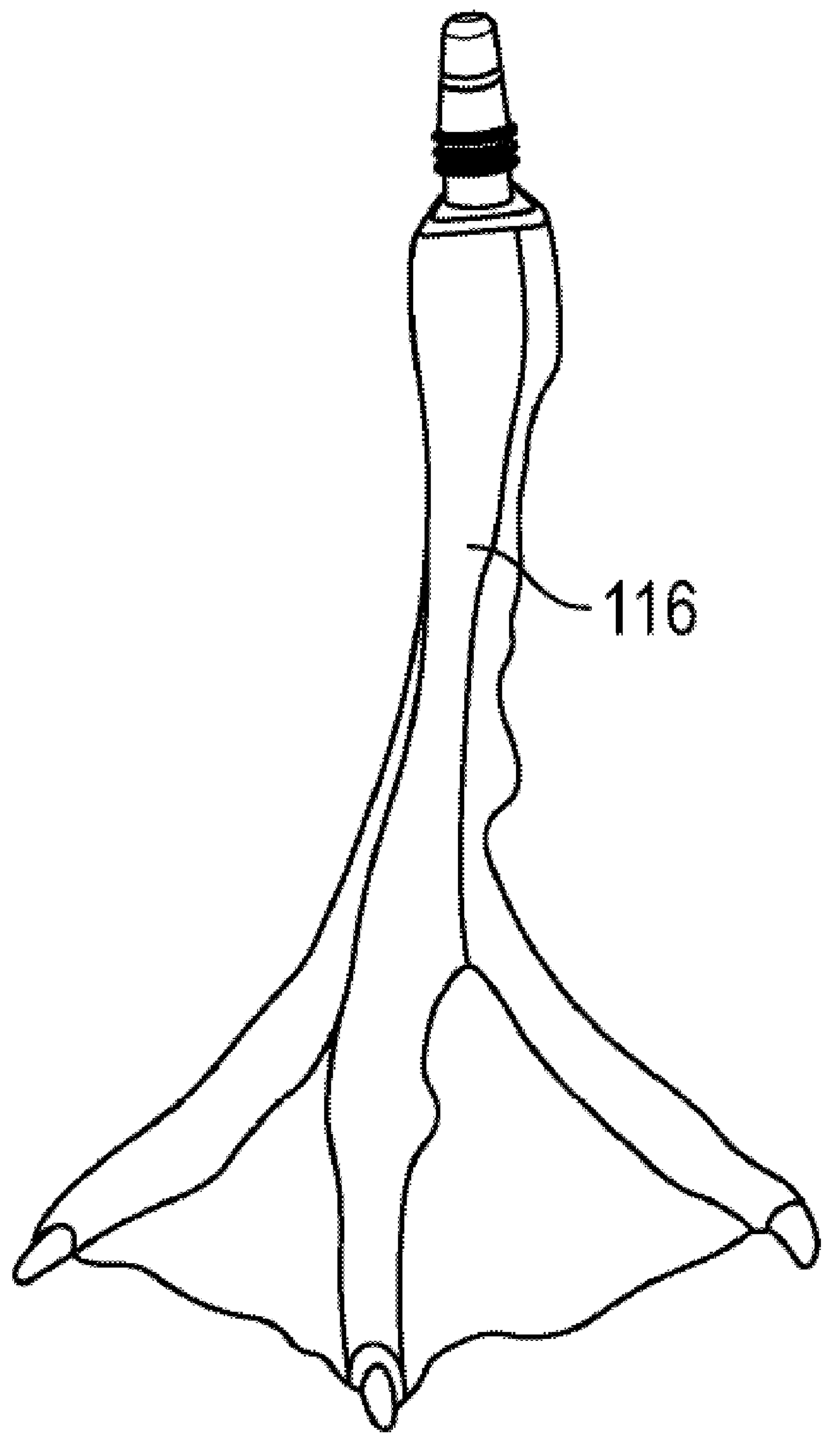
FIG. 15 shows an embodiment of leg member 116.
Figure 16:
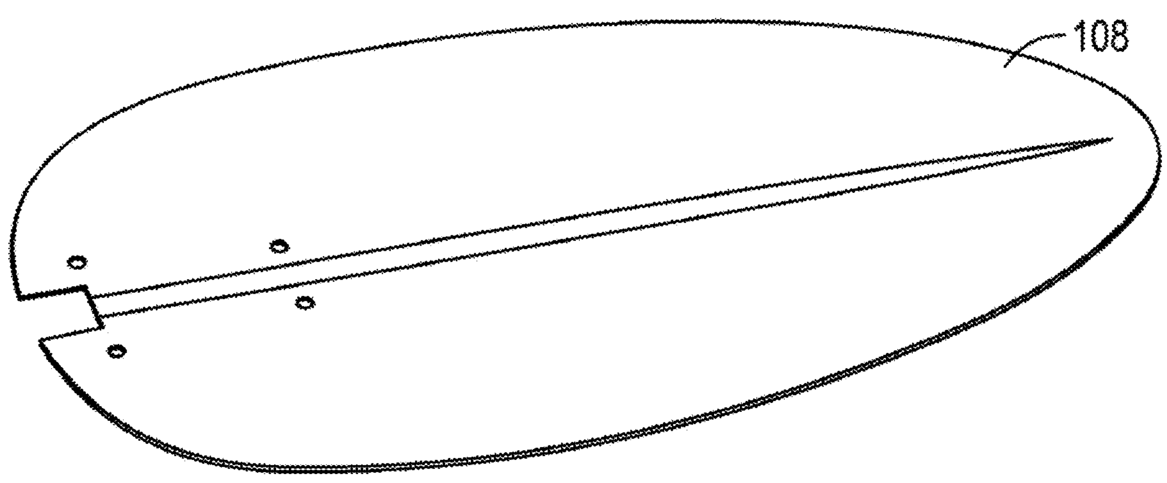
FIG. 16 shows an embodiment of a wing member 108.
Figure 17:
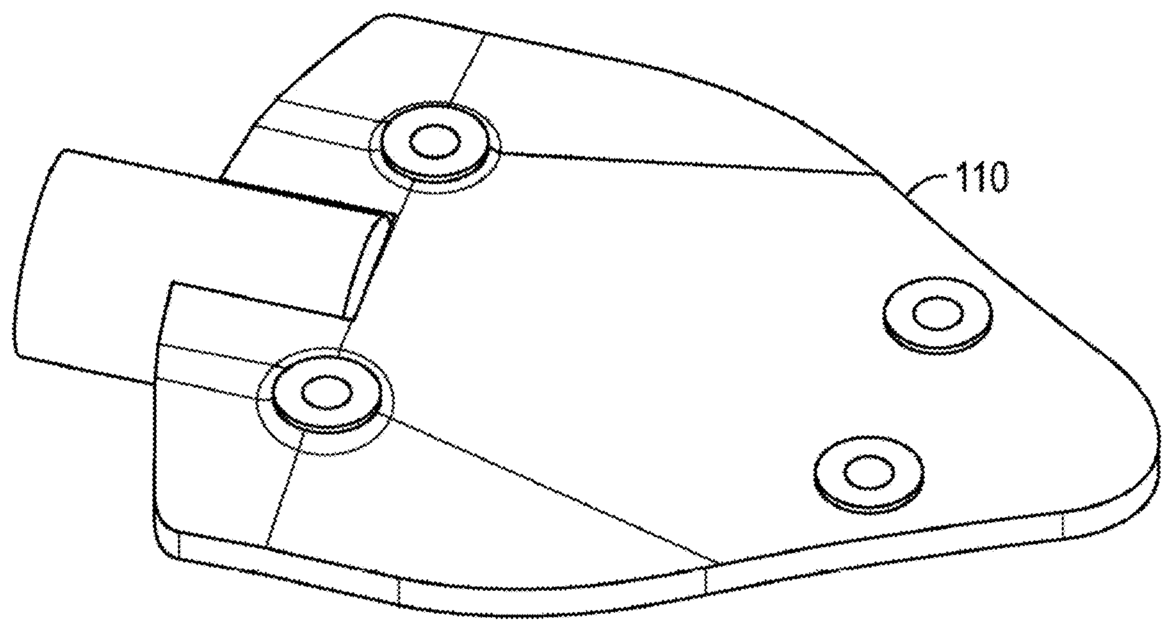
FIG. 17 shows an embodiment of a wing member attachment member 110.
Figure 18:
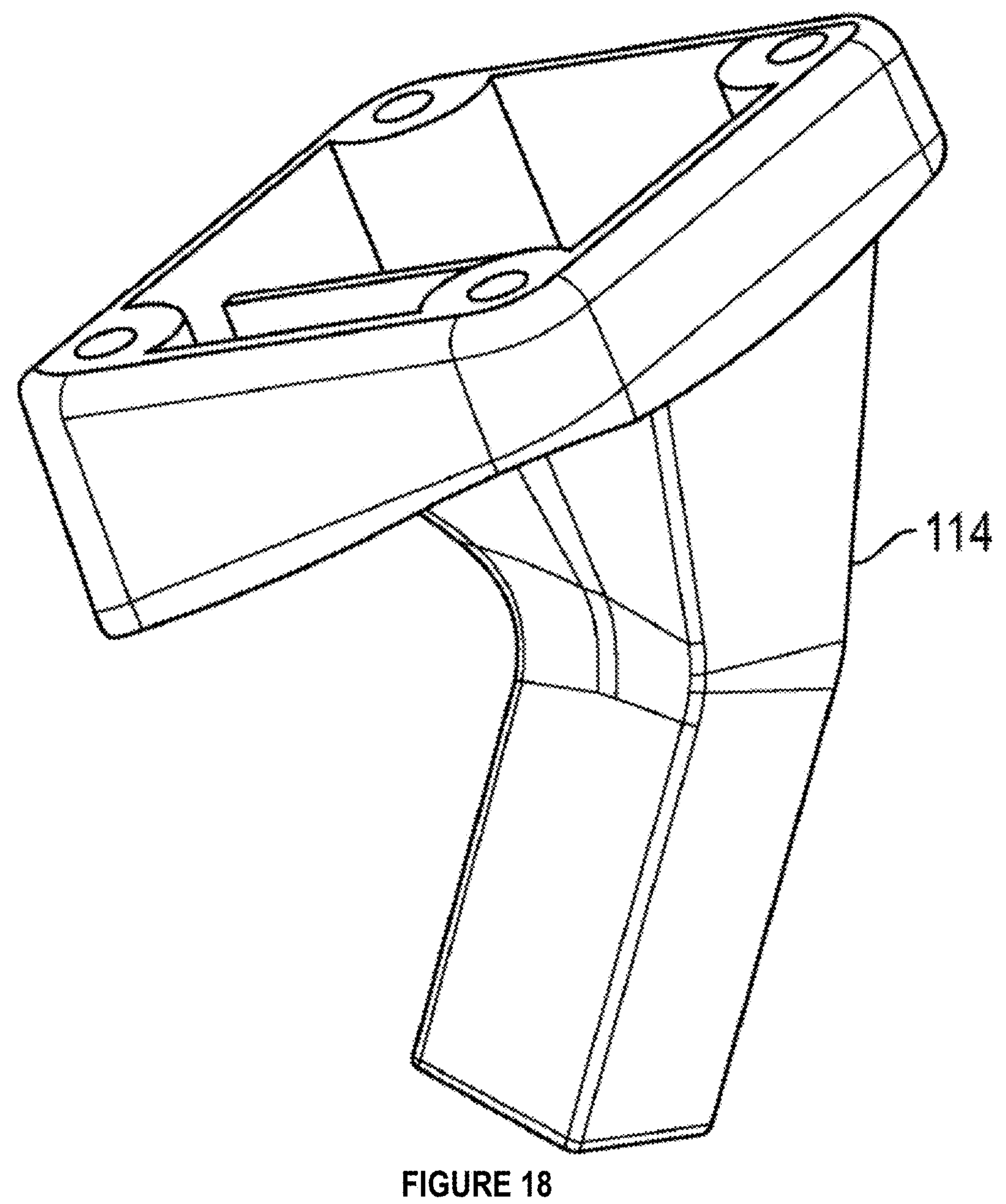
FIG. 18 shows an embodiment of a mounting member 114.
Figure 19:
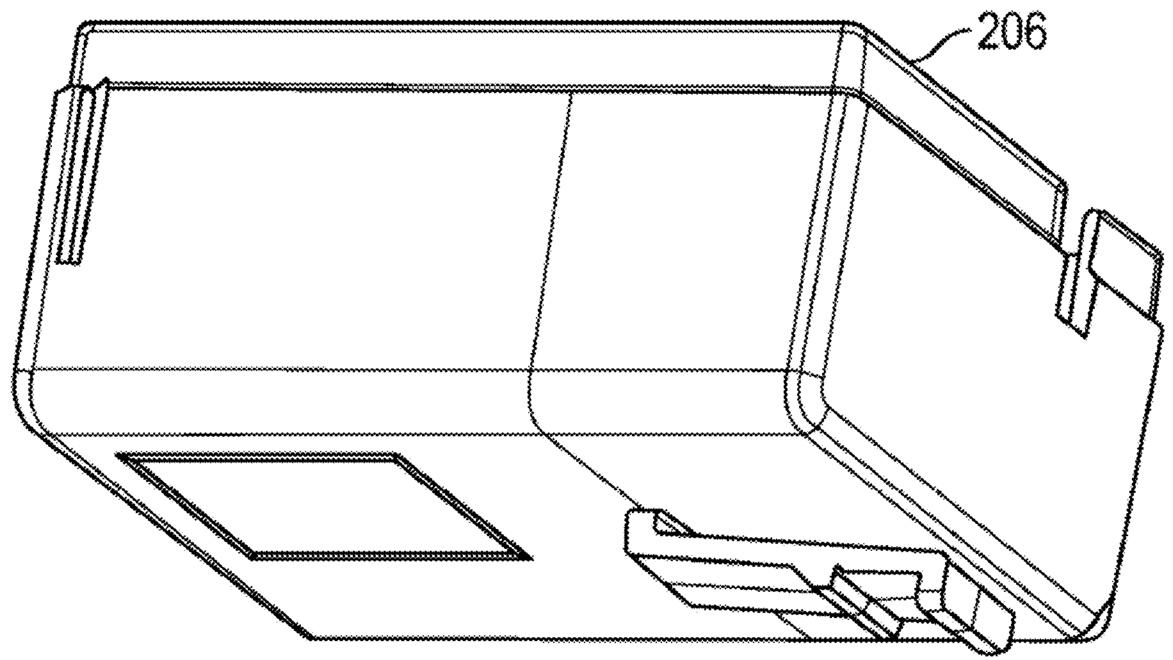
FIG. 19 shows an embodiment of a battery housing 206.
Figure 20:
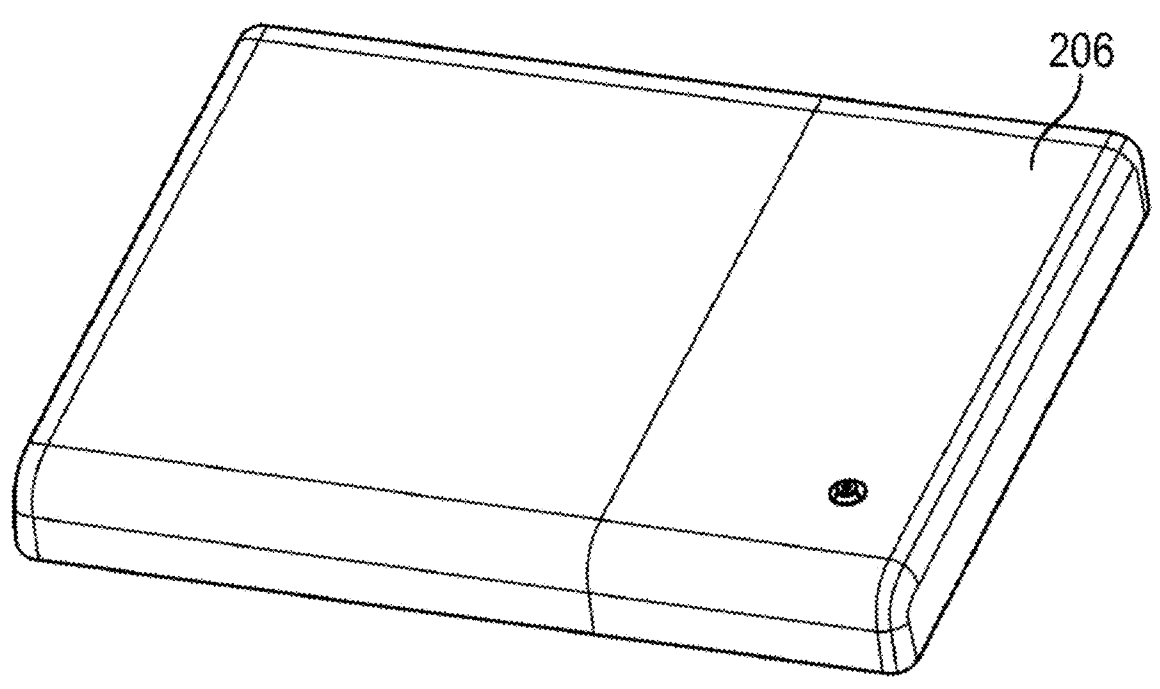
FIG. 20 shows an embodiment of a battery housing 206.
Figure 21:
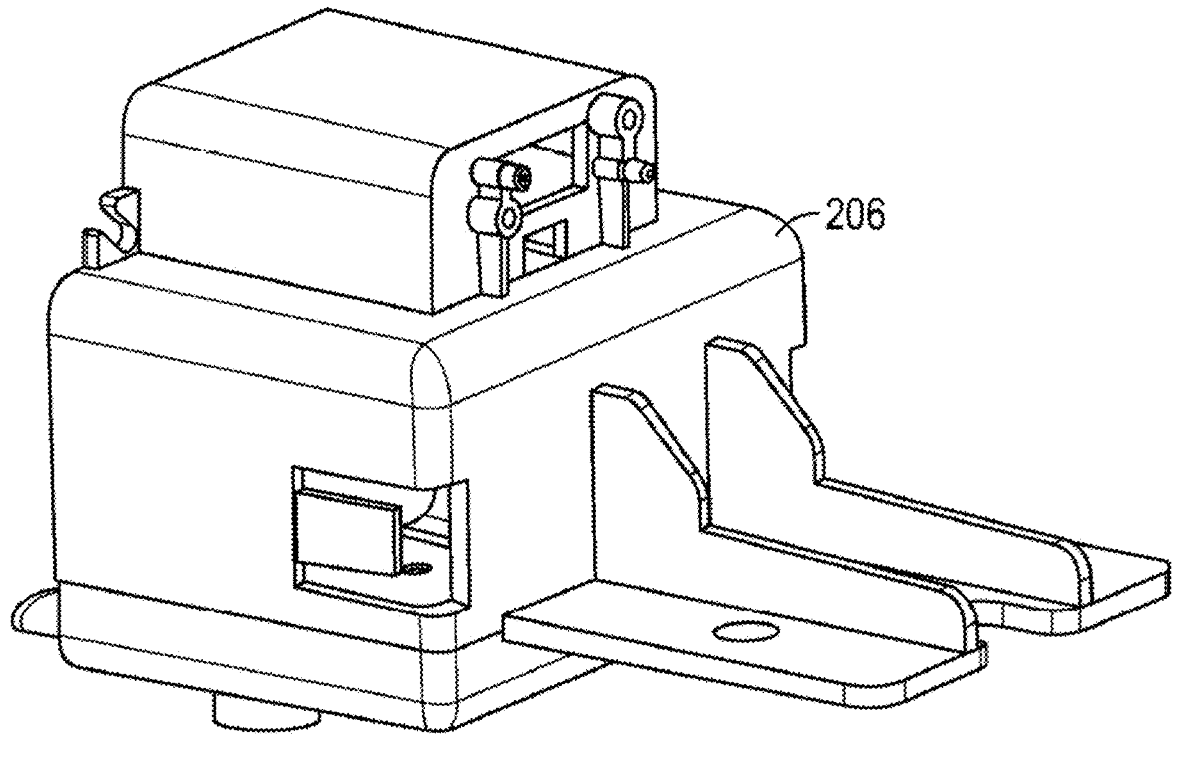
FIG. 21 shows a battery housing 206 and remote controller housing 208.
Figure 22:
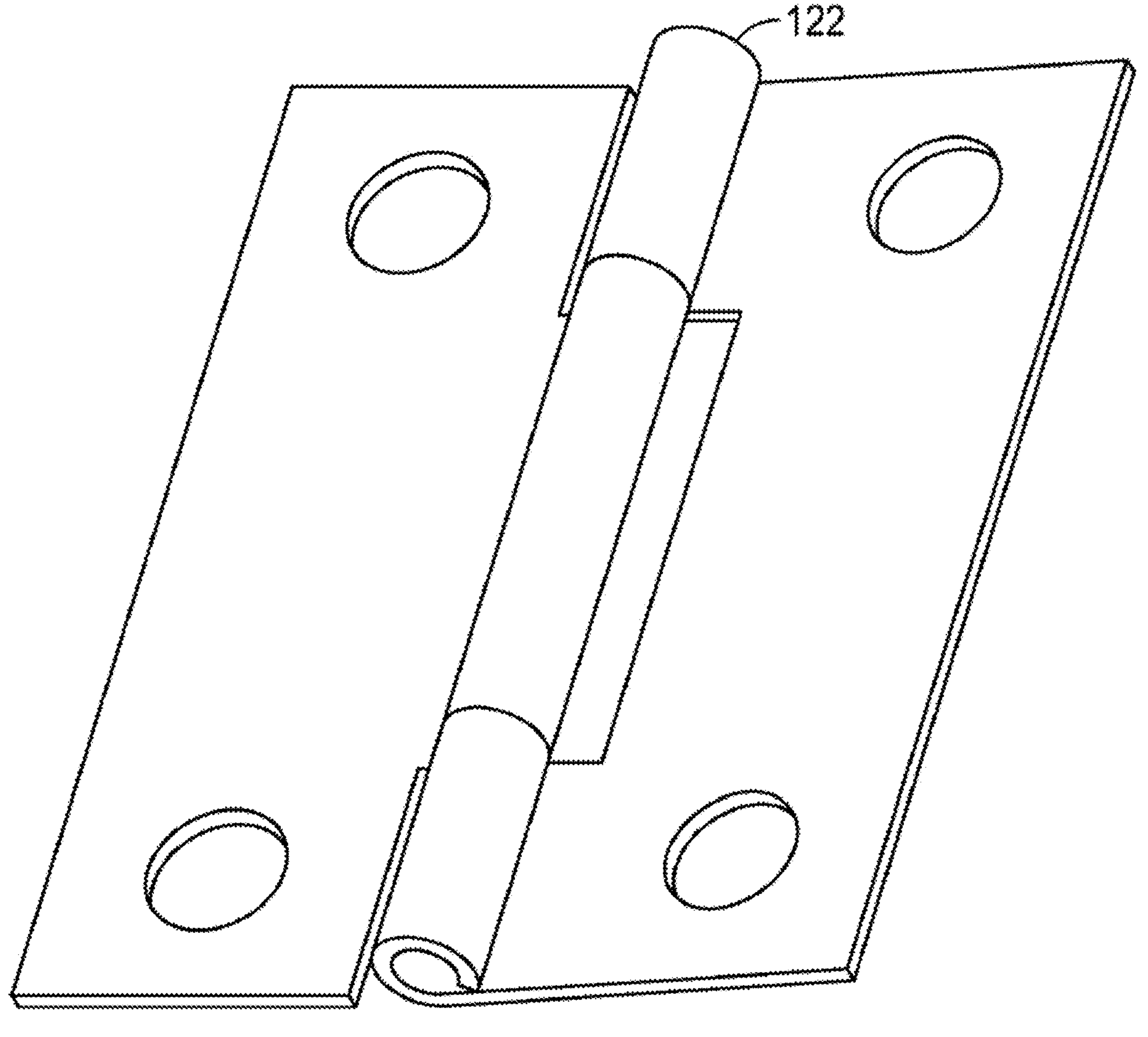
FIG. 22 shows an embodiment of a hinge 122.

FIGS. 1-22 show embodiments of an animal decoy 100 shaped to look like a mallard duck. It is understood that the present innovation can present the appearance of any multitude of avian or other animals, including all waterfowl. As shown in FIG. 1, the embodiment of the animal decoy 100 includes a housing unit 102, a head section 104, a tail section 106, two wing members 108, a wing member attachment member 110, a drive shaft adaptor 112, a mounting member 114, feet members 116, a latch member 118, and a switch 120. As shown in FIG. 2, an embodiment of the animal decoy 100 includes an interior space 202, an electric motor housing 204, a battery housing 206, a remote controller housing 208, and coupling member 210. As shown in FIG. 3, an embodiment of the mallard duck decoy 100 includes an electric motor 302, a drive shaft 304, an electric motor housing 204, a battery housing 206, a remote controller housing 208, and coupling member 210, a mounting member 114, and a switch 120.

FIG. 1 shows an embodiment of a mallard duck decoy 100 including a housing unit 102 made up of a head section 104 and a tail section 106. The mallard duck decoy 100 has two wing members 108 on opposing sides of the housing unit 102. The wing members 108 are attached to drive shaft (not shown) with a wing member attachment member 110 and a drive shaft adaptor 112. The housing unit 102 further includes a mounting member 114, feet members 116, a latch member 118, and a switch 120. FIG. 2 shows a cross sectional view of an embodiment of the animal decoy 100. The mallard duck decoy includes an interior space 202, an electric motor housing 204, a battery housing 206, a remote controller housing 208, and coupling member 210. FIG. 3 shows an embodiment of the mallard duck decoy 100 includes an electric motor 302, a drive shaft 304, an electric motor housing 204, a battery housing 206, a remote controller housing 208, and coupling member 210, a mounting member 114, and a switch 120.

The one or more housing units 102 can include, but are not limited to: the one or more head sections, the one or more body sections, and the one or more tail sections. The housing unit 102 can include a length, height, width, thickness, radius, first end, front side, second end, back side, right side, left side, top side, bottom side, outer surface, inner surface, and interior space 202. The housing unit 102 can include, but are not limited to, an oblate spheroid shape or ellipsoid shape. The housing unit 102 can include one or more recesses. The head section 104 can include one or more openings. For example, the head section 104 can include a first opening, second opening, third opening, fourth opening, and more openings. In an embodiment, the head section 104 and tail section 106 can be joined and/or fastened together to form the housing unit 102 and the interior space 202. In another embodiment, the head section 104, the tail section 106, and the body section can be positioned and/or fastened together to form an exterior surface and an interior space 202. In another embodiment, the head section 104 and the tail section 106 can be positioned and/or fastened together to form an exterior surface and an interior space 202. When joined together the head section 104 and tail section 106 can provide buoyancy for floating the animal decoy 100 on water. In an embodiment, the housing unit 102 can provide a watertight interior space 202. The housing unit 102 can include at least a portion of the outer surface shaped to resemble an avian animal. The exterior surface can be painted to look like an avian animal.

The housing unit 102 can include a length that varies widely. For example, the housing unit 102 can include a length from a short of about 1.0 cm, about 3.0 cm, or 5.0 cm, to a long of about 40.0 cm, about 50.0 cm, or about 60.0 cm. In another example, the housing unit 102 can include a length from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The housing unit 102 can include a width that varies widely. For example, the housing unit 102 can include a width from a short of about 1.0 cm, about 3.0 cm, or 5.0 cm, to a long of about 40.0 cm, about 50.0 cm, or about 60.0 cm. In another example, the housing unit 102 can include a width from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The housing unit 102 can include a height that varies widely. For example, the housing unit 102 can include a height from a short of about 1.0 cm, about 3.0 cm, or 5.0 cm, to a long of about 40.0 cm, about 50.0 cm, or about 60.0 cm. In another example, the housing unit 102 can include a height from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The housing unit 102 can include a weight that varies widely. For example, the housing unit 102 can include a weight from a low of about 0.1 kg, about 0.5 kg, or 1 kg, to a high of about 5.0 kg, about 10.0 kg, or about 20.0 kg. In another example, the housing unit 102 can include a weight from about 0.1 kg to about 0.5 kg, about 0.4 kg to about 2.0 kg, about 0.8 kg to about 4.0 kg, about 3.0 kg to about 12.0 kg, about 1.0 kg to about 7.0 kg, or about 6.8 kg to about 18.0 kg.

The one or more head sections 104 can include a length, height, width, thickness, radius, first end, front side, second end, back side, right side, left side, top side, bottom side, outer surface, inner surface, and interior space 202. The head section 104 can include one or more recesses. The head section 104 can include one or more openings. For example, the head section 104 can include a first opening, second opening, third opening, fourth opening, and more openings. The head section 104 can include the anterior shape of a bird. The head section 104 can include a mid-shape of an avian animal. The head section 104 can include at least a portion of the outer surface resembles an avian animal. The head section 104 can include, but is not limited to: a head, crown, bill, nape, back, neck, throat, wings, chest, and abdomen. The head section 104 can be attached to each other and/or integrally formed with the body section and/or the tail section 106 to form the housing unit 102 and the interior space 202.

The head section 104 can include a length that varies widely. For example, the head section 104 can include a length from a short of about 1.0 cm, about 3.0 cm, or 5.0 cm, to a long of about 40.0 cm, about 50.0 cm, or about 60.0 cm. In another example, the head section 104 can include a length from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The head section 104 can include a width that varies widely. For example, the head section 104 can include a width from a short of about 1.0 cm, about 3.0 cm, or 5.0 cm, to a long of about 40.0 cm, about 50.0 cm, or about 60.0 cm. In another example, the head section 104 can include a width from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The head section 104 can include a height that varies widely. For example, the head section 104 can include a height from a short of about 1.0 cm, about 3.0 cm, or 5.0 cm, to a long of about 40.0 cm, about 50.0 cm, or about 60.0 cm. In another example, the head section 104 can include a height from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The head section 104 can include a weight that varies widely. For example, the head section 104 can include a weight from a low of about 0.1 kg, about 0.5 kg, or 1 kg, to a high of about 5.0 kg, about 10.0 kg, or about 20.0 kg. In another example, the head section 104 can include a weight from about 0.1 kg to about 0.5 kg, about 0.4 kg to about 2.0 kg, about 0.8 kg to about 4.0 kg, about 3.0 kg to about 12.0 kg, about 1.0 kg to about 7.0 kg, or about 6.8 kg to about 18.0 kg.

The one or more body sections can include a length, height, width, thickness, radius, first end, front side, second end, back side, right side, left side, top side, bottom side, outer surface, inner surface, and interior space 202. The body section can include one or more recesses. The body section can include one or more openings. For example, the body section can include a first opening, second opening, third opening, fourth opening, and more openings. The body section can include a mid-shape of an avian animal. The body section can include at least a portion of the outer surface resembles an avian animal. The body section can include nape, back, neck, throat, wings, chest, abdomen, tail, undertail covert, rump, legs, wing, flank. The body section can be attached to each other and/or integrally formed with the head section 104 and/or the tail section 106 to form the housing unit 102 and the interior space 202. In one or more embodiments, the one or more body sections can be absent.

The body section can include a length that varies widely. For example, the body section can include a length from a short of about 1.0 cm, about 3.0 cm, or 5.0 cm, to a long of about 40.0 cm, about 50.0 cm, or about 60.0 cm. In another example, the body section can include a length from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The body section can include a width that varies widely. For example, the body section can include a width from a short of about 1.0 cm, about 3.0 cm, or 5.0 cm, to a long of about 40.0 cm, about 50.0 cm, or about 60.0 cm. In another example, the body section can include a width from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The body section can include a height that varies widely. For example, the body section can include a height from a short of about 1.0 cm, about 3.0 cm, or 5.0 cm, to a long of about 40.0 cm, about 50.0 cm, or about 60.0 cm. In another example, the body section can include a height from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The body section can include a weight that varies widely. For example, the body section can include a weight from a low of about 0.1 kg, about 0.5 kg, or 1 kg, to a high of about 5.0 kg, about 10.0 kg, or about 20.0 kg. In another example, the body section can include a weight from about 0.1 kg to about 0.5 kg, about 0.4 kg to about 2.0 kg, about 0.8 kg to about 4.0 kg, about 3.0 kg to about 12.0 kg, about 1.0 kg to about 7.0 kg, or about 6.8 kg to about 18.0 kg.

The one or more tail sections can include a length, height, width, thickness, radius, first end, front side, second end, back side, right side, left side, top side, bottom side, outer surface, inner surface, and interior space 202. The tail section 106 can include one or more recesses. The tail section 106 can include one or more openings. For example, the tail section 106 can include a first opening, second opening, third opening, fourth opening, and more openings. The tail section 106 can include the posterior shape of a bird. The tail section 106 can include at least a portion of the outer surface resembles an avian animal. The tail section 106 can include, but is not limited to: a tail, undertail covert, rump, legs, wing, flank, and back. The tail section 106 can be attached to each other and/or integrally formed with the head section 104 and/or the body section to form the housing unit 102 and the interior space 202. The tail section 106 can include one or more loop members. In another embodiment, the loop member can provide support for a rope to be tied to the animal decoy 100. In an embodiment, the tail section 106 can be removed from the head section 104 to allow access to the interior space 202 of the animal decoy 100. In another embodiment, the top section can be opened and detached from the animal decoy 100. In another embodiment, a door on the top section can be opened with the use of a hinge 122. The top tail section 106 can be molded in such a way that the openings are positioned where the animal decoy's feathers change appearance to keep realistic appearance of the animal decoy 100.

The tail section 106 can include a length that varies widely. For example, the tail section 106 can include a length from a short of about 1.0 cm, about 3.0 cm, or 5.0 cm, to a long of about 40.0 cm, about 50.0 cm, or about 60.0 cm. In another example, the tail section 106 can include a length from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The tail section 106 can include a width that varies widely. For example, the tail section 106 can include a width from a short of about 1.0 cm, about 3.0 cm, or 5.0 cm, to a long of about 40.0 cm, about 50.0 cm, or about 60.0 cm. In another example, the tail section 106 can include a width from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The tail section 106 can include a height that varies widely. For example, the tail section 106 can include a height from a short of about 1.0 cm, about 3.0 cm, or 5.0 cm, to a long of about 40.0 cm, about 50.0 cm, or about 60.0 cm. In another example, the tail section 106 can include a height from about 1.0 cm to about 60.0 cm, about 2.0 cm to about 12.0 cm, about 3.0 cm to about 20.0 cm, about 5.0 cm to about 32.0 cm, about 10.0 cm to about 27.0 cm, or about 16.5 cm to about 42.0 cm.

The tail section 106 can include a weight that varies widely. For example, the tail section 106 can include a weight from a low of about 0.1 kg, about 0.5 kg, or 1 kg, to a high of about 5.0 kg, about 10.0 kg, or about 20.0 kg. In another example, the tail section 106 can include a weight from about 0.1 kg to about 0.5 kg, about 0.4 kg to about 2.0 kg, about 0.8 kg to about 4.0 kg, about 3.0 kg to about 12.0 kg, about 1.0 kg to about 7.0 kg, or about 6.8 kg to about 18.0 kg.

Various fasteners can be used to hold the tail section 106 and/or body section and/or head section 104 together to form the housing unit 102. In an embodiment, the tail section 106 can include a latch member 118 disposed thereon. In an embodiment, the latch member 118 can be positioned toward the front and top of the tail section 106. In another embodiment, a connector strap 119 such as a bungee cord can be positioned toward the back and top of the head section 104. In another embodiment, the bungee cord can be threaded through holes located at the top rear of the head section 104. In another embodiment, head section 104 and tail section 106 can be joined and/or fastened by looping the bungee cord of the head section 104 around the latch of the tail section 106.

The one or more joints or the one or more hinges 122 can be used to attach the head section 104 and/or body section and/or the tail section 106 to each other. In an embodiment, the head section 104 can be attached to the body section and/or the tail section 106 with a joint or a hinge 122. In another embodiment, the body section can be attached to the head section 104 and/or the tail section 106 with a joint or a hinge 122. The hinges 122 can include a first leaf and a second leaf, a knuckle, and a pin.

The one or more door members can include a length, height, width, thickness, radius, first end, front side, second end, back side, right side, left side, top side, bottom side, outer surface, inner surface, and interior space 202. In an embodiment, the door member can be attached to and/or integrally formed with the head section 104, body section, tail section 106, and/or housing unit 102. In another embodiment, the door member can include attached to and/or integrally with a hinge. In another embodiment, the hinged door member can be opened to provide access to the interior space 202 of the animal decoy 100 while remaining attached to the head section 104, body section, tail section 106, and/or housing unit 102. In another embodiment, the door can be removable or detachable from the head section 104, body section, tail section 106, and/or housing unit 102. In another embodiment, the door member can be positioned on the top of the tail section 106 of the animal decoy 100. In another embodiment, the door member can be opened and/or detached to allow access the electronic and mechanical components and allow access for storage of various accessories, such as a remote controller.

The mounting member 114 can include a length, height, width, thickness, radius, first end, front side, second end, back side, right side, left side, top side, bottom side, outer surface, inner surface, and interior space 202. The mounting member 114 can include, but is not limited to, a cube shape and rectangular cuboid shape. The mounting member 114 can include an angled portion. In an embodiment, the mounting member 114 can be attached to and/or integrally formed with the head section 104, body section, tail section 106, housing unit 102, support member, electric motor housing, coupling member 210, battery housing, and/or electric motor 302. In another embodiment, the mounting member 114 can be attached to the head section 104 at a recess at a first end and a support member at the angled portion. In another embodiment, the mounting member 114 can be attached to the head section 104 at a recess using screws that further secure the electric motor housing, coupling member 210, battery housing, and/or electric motor 302 into the interior space 202 of the housing unit 102. By connecting to the mounting member, the vibrational force is transferred to the mounting member and thus to the support structure or member.

In an embodiment, the housing unit 102, support member, and mounting member 114 can form an angle. For example, the length of the housing unit 102 can form the first arm of the angle, the length of the support member can form the second arm of the angle, and the mounting member 114 can form the vertex of the angle. The angle between the length of the housing unit 102 and the length of the support member can vary widely. For example, the angle between the length of the housing unit 102 and the length of the support member can be from a low of about 0.10, about 10, or about 2°, to a high of about 90°, about 180°, or about 360°. In another example, the angle between the length of the housing unit 102 and the length of the support member can be from about 0.1° to about 359.9°, about 0.1° to about 90°, about 10 to about 179.9°, about 900 to about 180°, about 250 to about 45°, or about 300 to about 66°.

The one or more recesses can include a length, height, width, thickness, radius, first end, front side, second end, back side, right side, left side, top side, bottom side, outer surface, inner surface, and interior space 202. The recess can include, but is not limited to, a cube shape and rectangular cuboid shape. In an embodiment, the recesses can include a shape to position and hold the mounting member 114 to the head section 104, body section, tail section 106, and/or housing unit 102. The recess may help secure the mounting member in place, allowing for greater force distribution. This may help to reduce the transfer of vibration to the decoy body.

The one or more support members can include, but are not limited to: one or more poles, one or more support rods, one or more stakes, one or more floats, one or more buoys, one or more wire hangs, one or more cords, and other structural supports. The support member can include a length, height, width, thickness, radius, first end, front side, second end, back side, right side, left side, top side, bottom side, outer surface, inner surface, and interior space 202. The support members can be attached to and/or integrally formed with the mounting member 114 or the housing unit 102.

The support member can include a length that can vary widely. For example, the support member can have a length from a short of about 1.0 cm, about 2.0 cm, or about 5.0 cm, to a long of about 10.0 cm, about 15.0 cm, or about 25.0 cm. In another example, the support member can have a length from about 1.0 cm to about 25.0 cm, about 5.0 cm to about 10.0 cm, or about 6.0 cm to about 12.0 cm. The radius of the support member can vary widely. For example, the support member can have a radius from a short of about 0.1 cm, about 0.5 cm, or about 1.0 cm, to a long of about 2.0 cm, about 5.0 cm, or about 10.0 cm. In another example, the support member can have a length from about 0.1 cm to about 10.0 cm, about 0.2 cm to about 1.5 cm, or about 0.6 cm to about 4.0 cm.

The animal decoy 100 can include an animation or movement to provide a display that can attract animal to the location of the animal decoy 100. The one or more electric motors 302 can be operatively attached to the axle, drive shaft 304, wing member, and/or wing member attachment member. In an embodiment, the animation or movement can include rotating and/or up and down flapping of the wing members. In another embodiment, the animal decoys can include the electric motor 302 and a pair of wing members that are operatively attached to the opposing sides of the axle and/or the drive shaft 304 using a wing member support member so that the electric motor 302 can operate the wing members 108, which can be positioned on the right side and left side of the decoy body and exterior housing unit 102.

The animal decoy 100 can include rotating and/or up and down flapping of the wing members at a rotations per minute (RPM) that varies widely. For example, the animal decoy 100 can include rotating and/or up and down flapping of the wing members at a rotations per minute from a low of about 200 RPM, about 300 RPM, about 325 RPM, or about 350 RPM, to a high of about 400 RPM, about 425 RPM, or about 450 RPM. For example, the animal decoy 100 can include rotating and/or up and down flapping of the wing members at a rotations per minute from about 200 RPM to 450 RPM, 300 RPM to 450 RPM, about 315 RPM to 360 RPM, about 330 RPM to 400 RPM, about 350 RPM to 425 RPM, or about 400 RPM to 450 RPM.

The electric motor 302 can include a horsepower that varies widely. For example, the electric motor 302 can include a horsepower from a low of about 0.01 hp, about 0.02 hp, or about 0.03 hp, to a high of about 1 hp, about 2 hp, or about 5 hp. For example, the electric motor 302 can include a horsepower from about 0.01 hp to about 5 hp, about 0.01 hp to about 0.1 hp, about 0.02 hp to about 1 hp, about 0.01 hp to about 0.05 hp, or about 0.2 hp to about 0.5 hp.

The one or more electric motor housings can include a length, height, width, thickness, radius, first end, front side, second end, back side, right side, left side, top side, bottom side, outer surface, inner surface, and interior space 202. In an embodiment, the one or more electric motor housing 204 units can be attached to and/or integrally formed with the battery housings. In an embodiment, the one or more electric motor housing 204 units can be separate from the one or more battery housings. In another embodiment, the electric motor housing 204 units can be inserted into the internal space of the animal decoy 100 through the removable door in the rear of the animal decoy 100. In another embodiment, the housing unit 102 can be inserted into the internal space of the animal decoy 100 by removing the tail section 106 of the animal decoy 100.

The electric motor housing 204 can include a length that varies widely. For example, the electric motor housing 204 can include a length from a short of about 0.1 cm, about 1.0 cm, or 2.0 cm, to a long of about 8.0 cm, about 10.0 cm, or about 20.0 cm. In another example, the electric motor housing 204 can include a length from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The electric motor housing 204 can include a width that varies widely. For example, the electric motor housing 204 can include a width from a short of about 0.1 cm, about 1.0 cm, or 2.0 cm, to a long of about 8.0 cm, about 10.0 cm, or about 20.0 cm. In another example, the electric motor housing 204 can include a width from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The electric motor housing 204 can include a height that varies widely. For example, the electric motor housing 204 can include a height from a short of about 0.1 cm, about 1.0 cm, or 2.0 cm, to a long of about 8.0 cm, about 10.0 cm, or about 20.0 cm. In another example, the electric motor housing 204 can include a height from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The one or more coupling member 210 can provide a dampener between the electric motor and the housing unit 102 of the animal decoy 100. The coupling member 210 can include a length, height, width, thickness, radius, first end, front side, second end, back side, right side, left side, top side, bottom side, outer surface, inner surface, and interior space 202. In an embodiment, the coupling member 210 can be attached to and/or integrally formed with the electric motor housing. In another embodiment, the coupling member 210 can be attached to and/or integrally formed with the battery housing. In another embodiment, the coupling member 210 can be attached to and/or integrally formed with the inner surface of the head sections, body sections, tail sections, and/or housing unit 102. In another embodiment, the coupling member 210 is not attached to and/or integrally formed with the inner surface of the head section 104, body section, tail section or housing unit 102. In another embodiment, the head section 104, body section, and/or tail section 106 can be attached to and/or integrally formed with to the mounting member 114, electric motor housing 204, battery housing, remote controller housing 208, and coupling member 210. The coupling member 210 can be flexible to minimizes vibration of the animal decoy 100 during operation of the electric motor 302.

The coupling member 210 can include a length that varies widely. For example, the coupling member 210 can include a length from a short of about 0.1 cm, about 1.0 cm, or 2.0 cm, to a long of about 8.0 cm, about 10.0 cm, or about 20.0 cm. In another example, the coupling member 210 can include a length from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The coupling member 210 can include a width that varies widely. For example, the coupling member 210 can include a width from a short of about 0.1 cm, about 1.0 cm, or 2.0 cm, to a long of about 8.0 cm, about 10.0 cm, or about 20.0 cm. In another example, the coupling member 210 can include a width from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The coupling member 210 can include a height that varies widely. For example, the coupling member 210 can include a height from a short of about 0.1 cm, about 1.0 cm, or 2.0 cm, to a long of about 8.0 cm, about 10.0 cm, or about 20.0 cm. In another example, the coupling member 210 can include a height from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The coupling member 210 can have a thickness that varies widely. For example, the coupling member 210 can have height or thickness from a low of about 0.01 cm, about 0.05 cm, or about 0.5 cm, to a high of about 1.0 cm, about 2.0 cm, or about 5.0 cm. In another example, the coupling member 210 can have thickness from about 0.01 cm to about 5.0 cm, about 0.01 cm to about 1.0 cm, about 0.1 cm to about 0.55 cm, about 0.2 cm to about 0.75 cm, or about 0.3 cm to about 1.25 cm.

The coupling member 210 can have a flexibility or a yield strength or elastic limit that varies widely. For example, the coupling member 210 can have yield strength or elastic limit from a low of about 1 MPa, about 50 MPa, or about 75 MPa, to a high of about 150 MPa, about 200 MPa, or about 300 MPa. In another example, the coupling member 210 can have yield strength or elastic limit from about 1 MPa to about 300 MPa, about 50 MPa to about 100 MPa, about 75 MPa to about 250 MPa, or about 100 MPa to about 200 MPa.

The one or more battery housings 206 can include a length, height, width, thickness, radius, first end, front side, second end, back side, right side, left side, top side, bottom side, outer surface, inner surface, and interior space 202. In an embodiment, the battery housing 206 can be attached to and/or integrally formed with the one or more electric motor housing 204. In an embodiment, the battery housing 206 can be separate from the one or more electric motor housing 204.

The battery housing 206 can include a length that varies widely. For example, the battery housing 206 can include a length from a short of about 0.1 cm, about 1.0 cm, or 2.0 cm, to a long of about 8.0 cm, about 10.0 cm, or about 20.0 cm. In another example, the battery housing 206 can include a length from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The battery housing 206 can include a width that varies widely. For example, the battery housing 206 can include a width from a short of about 0.1 cm, about 1.0 cm, or 2.0 cm, to a long of about 8.0 cm, about 10.0 cm, or about 20.0 cm. In another example, the battery housing 206 can include a width from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The battery housing 206 can include a height that varies widely. For example, the battery housing 206 can include a height from a short of about 0.1 cm, about 1.0 cm, or 2.0 cm, to a long of about 8.0 cm, about 10.0 cm, or about 20.0 cm. In another example, the battery housing 206 can include a height from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The one or more remote controllers can used to control the electric motor 302. In an embodiment, the remote controllers can be electronically coupled to the battery for recharging. The remote controller housing 208 can include a length, height, width, thickness, radius, first end, front side, second end, back side, right side, left side, top side, bottom side, outer surface, inner surface, and interior space 202. In an embodiment, the remote controller housing 208 can be attached to and/or integrally formed with the one or more battery housings. In an embodiment, the remote controller housing 208 can be separate from the one or more battery housings.

The one or more batteries can include, but are not limited to: a lithium ion battery and rechargeable battery. The battery can include a lithium ion battery. The battery can include a rechargeable battery. The battery can include a voltage that varies widely. For example, the battery can have a voltage of about 1.5 V (volts), about 3 V, about 6 V, about 6.4 V, about 9 V, or about 12 V.

The one or more wing members 108 can include, but are not limited to: a flat shape, wing shape, contoured shape, bowed shape, paddle shape, and semi-helical shape. The wing member 108 can include a length, height, width, thickness, radius, first end, front side, second end, back side, right side, left side, top side, bottom side, outer surface, inner surface, and interior space 202. The wing member 108 can include a substantially flat shape having a terminating, distal end. In an embodiment, the wing members 108 can be positioned external to the housing unit 102 with a member projecting into the housing that is operatively coupled to the motor such as through a drive shaft 304 of the electric motor 302 to allow the motor to rotate the one or more wing members 108. In another embodiment, the housing unit 102 can have two wing members 108 on opposing sides of the housing that each project into the housing unit 102, where each wing member 108 is operatively coupled to the one or more electric motors 302 such that the electric motor 302 can rotate the wing members 108 either independently or concurrently. In another embodiment, the animal decoy 100 can include first wing member 108 on one side of the body and a second wing member 108 on the other side of said body, where the wing members 108 extending laterally out and away from the housing unit 102, each terminating in a respective distal end and devoid of any supporting restraint at the distal end, each of the wing member 108 being directly attached to a separate wing member attachment member 110 laterally disposed with respect to the housing unit 102 and extending along a longitudinal axis. In another embodiment, the wing member 108 can be operatively connected to the electric motor 302 with the one or more drive shaft adapters and/or wing member attachment member 110. In another embodiment, the animal decoy 100 can include one or more wing members 110 residing external to the housing unit 102 with a member projecting into the housing that is operatively coupled to the motor such as through a drive shaft 304 of the electric motor 302 to allow the electric motor 302 to rotate the one or more wing members 108. In another embodiment, the electric motor 302 can be operatively connected to the one or more wing members 108. In another embodiment, the wing members 108 can be positioned on a left side and a right side of the animal decoy 100. In another embodiment, the electric motor 302 can be configured to rotate the wing members 108 in the same direction or different directions. In another embodiment, the electric motor 302 can cause the one or more wing members 108 to produce flapping maneuvers. In yet another embodiment, the one or more wing members 108 can be positioned at the sides of the head section 104 and/or tail section 106 of the animal decoy 100.

The wing member 108 can include a length that varies widely. For example, the wing member 108 can include a length from a short of about 0.1 cm, about 1.0 cm, or 2.0 cm, to a long of about 8.0 cm, about 10.0 cm, or about 20.0 cm. In another example, the wing member 108 can include a length from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The wing member 108 can include a width that varies widely. For example, the wing member 108 can include a width from a short of about 0.1 cm, about 1.0 cm, or 2.0 cm, to a long of about 8.0 cm, about 10.0 cm, or about 20.0 cm. In another example, the wing members can include a width from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The wing member 108 can include a height that varies widely. For example, the wing members can include a height from a short of about 0.1 cm, about 1.0 cm, or 2.0 cm, to a long of about 8.0 cm, about 10.0 cm, or about 20.0 cm. In another example, the wing members 108 can include a height from about 0.1 cm to about 20.0 cm, about 0.5 cm to about 5.0 cm, about 2.5 cm to about 12.0 cm, about 3.0 cm to about 8.0 cm, about 5.0 cm to about 17.0 cm, or about 6.5 cm to about 9.0 cm.

The one or more drive shaft adapters 110 can include a length, height, width, thickness, radius, first end, front side, second end, back side, right side, left side, top side, bottom side, outer surface, inner surface, and interior space 202. In an embodiment, the drive shaft adapters 110 can be attached to and/or integrally formed with the wing member 108, wing member attachment member 110, drive shaft 304, and/or axle.

The one or more drive shaft 304 can include a length, height, width, thickness, radius, first end, front side, second end, back side, right side, left side, top side, bottom side, outer surface, inner surface, and interior space 202. The drive shaft 304 can include a length that varies widely. For example, the drive shaft 304 can have a length from a short of about 1.0 cm, about 2.0 cm, or about 5.0 cm, to a long of about 10.0 cm, about 15.0 cm, or about 25.0 cm. In another example, the axle can have a length from about 1.0 cm to about 25.0 cm, about 5.0 cm to about 10.0 cm, or about 6.0 cm to about 12.0 cm.

The drive shaft 304 can include a radius that varies widely. For example, the drive shaft 304 can have a radius from a short of about 0.1 cm, about 0.5 cm, or about 1.0 cm, to a long of about 2.0 cm, about 5.0 cm, or about 10.0 cm. In another example, the drive shaft 304 can have a length from about 0.1 cm to about 10.0 cm, about 0.2 cm to about 1.5 cm, or about 0.6 cm to about 4.0 cm.

The one or more axles can include a length, height, width, thickness, radius, first end, front side, second end, back side, right side, left side, top side, bottom side, outer surface, inner surface, and interior space 202. The axle can include a length that varies widely. For example, the axles can have a length from a short of about 1.0 cm, about 2.0 cm, or about 5.0 cm, to a long of about 10.0 cm, about 15.0 cm, or about 25.0 cm. In another example, the axle can have a length from about 1 cm to about 25.0 cm, about 5.0 cm to about 10.0 cm, or about 6.0 cm to about 12.0 cm.

The axle can include a radius that varies widely. For example, the axle can have a radius from a short of about 0.1 cm, about 0.5 cm, or about 1.0 cm, to a long of about 2.0 cm, about 5.0 cm, or about 10.0 cm. In another example, the drive shafts can have a length from about 0.1 cm to about 10.0 cm, about 0.2 cm to about 1.5 cm, or about 0.6 cm to about 4.0 cm.

The one or more switches 120 can be in electronic communication with the electric motor 302. In an embodiment, the switch 120 can turn electric motor 302 on and off. In another embodiment, the electric motor 302 can be optionally and directly connected to the removable battery using a wire. This direct connection from electric motor 302 to the removable battery can provide the user with the ability to operate the electric motor 302 in the event that other electrical components fail, such as switches, timers, PC boards, and the like.

In an embodiment, the animal decoy 100 can include a receiver and transmitter that can allow the electric motor 302 to be operated with a remote controller. In an embodiment, the receiver can be positioned in the inner space of the housing unit 102. In an embodiment, the remote controller can include an electric programmable device that is capable of controlling the movement of the decoy wing members by the user. In an embodiment, the remote controller can be stored in the battery housing. In an embodiment, the remote controller can include a rechargeable battery. In an embodiment, the rechargeable battery of the remote controller can be recharged by connecting to the power unit. In an embodiment, the power unit can include USB connectors, DIN connectors, barrel connectors, 6.35 mm connectors, 3.5 mm connectors, 2.5 mm connectors, RCA connectors, HDMI connectors, molex connectors, IEC connectors, JST connectors, and the like.

One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" the indicated value, and consider experimental error and variations that would be expected by a person having ordinary skill in the art.

What is claimed is:

1. An animal decoy comprising:

a housing unit, wherein the housing unit in the shape of an avian animal comprising two housing unit sections each comprising blow-molded plastic, and an interior space at least partially defined by said housing unit sections;

an electric motor housing, wherein the electric motor housing is positioned in the interior space of the housing unit;

an electric motor, wherein the electric motor is positioned on the electric motor housing;

a battery housing, wherein the battery housing is positioned in the interior space of the housing unit;

a switch, wherein the switch is operative connected to the electric motor;

at least one wing member attachment member;

at least one wing member, wherein the at least one wing member is attached to the at least one wing member attachment member;

a drive shaft, wherein the drive shaft is operative connected to the electric motor and the at least one wing member attachment member; and a mounting member.

2. The animal decoy of claim 1 further comprising a coupling member, wherein the coupling member is attached to the battery housing at a first end and the electric motor housing at a second end.

3. The animal decoy of claim 1 further comprising a coupling member attached to the motor and the mounting member, and wherein the motor is coupled to the mounting member through the coupling member and operationally configured such that when the motor is in operation, the motor will create vibrational effect that will be transferred to the mounting member.

4. The animal decoy of claim 1, wherein the avian animal is a mallard duck.

5. The animal decoy of claim 1 further comprising a remote controller housing.

6. The animal decoy of claim 1, wherein the housing unit has a bottom with a recess formed into the bottom, wherein the mounting member comprises a top portion and a bottom portion, wherein the recess is shaped to conform to the shape of at least a portion of the top portion of the mounting member.

7. The animal decoy of claim 1, wherein the mounting member comprises an angled portion with an angle of between about 1° to about 179.9°.

8. The animal decoy of claim 2, wherein the coupling member has a yield strength from about 1 MPa to about 300 MPa.

9. The animal decoy of claim 3, wherein the coupling member has a yield strength from about 1 MPa to about 300 MPa.

10. The animal decoy of claim 3, wherein the coupling member has a yield strength from about 1 MPa to about 100 MPa.

11. The animal decoy of claim 1 wherein the two housing unit sections are connected to each other.

12. The animal decoy of claim 11 wherein the two housing unit sections are connected via a hinge member that allows one housing unit section to pivot along the hinge in relation to the other housing unit section between an opened position and a closed position, and wherein the interior space of the housing unit is accessible when the housing unit sections are in the opened position.

13. The animal decoy of claim 12 further comprising a latch member connected to at least one housing unit section that secures the sections in the closed position when engaged.

14. The animal decoy of claim 12 comprising a latch member deposed thereon one housing unit section and a bungee cord deposed thereon the other housing unit section, and wherein the bungee cord engages the latch member to assist in securing the sections in the closed position.

15. The animal decoy of claim 12 wherein the battery is positioned within the housing unit so as to be accessible when the two sections are in the opened position.

16. The animal decoy of claim 12 further comprising a remote control and a remote control housing, wherein said remote control housing is positioned within the interior space so as to be accessible when the housing unit sections are in the opened position.

17. The animal decoy of claim 12 wherein the hinge member is capable of pivoting about an angle between about 1° to about 179.9°.

18. The animal decoy of claim 1 wherein the motor is configured to rotate the at least one wing member at a rate of over 200 rpm.

19. The animal decoy of claim 12 wherein said mounting member is configured to be mounted to a support member.

20. An animal decoy comprising:

a housing unit, wherein the housing unit in the shape of an avian animal comprising two housing unit sections each comprising blow-molded plastic, and an interior space at least partially defined by said housing unit sections, wherein said two housing unit sections are connected to each other via a hinge and configured to move about said hinge in relation to each other between an opened position in which the interior space is at least partially accessible and a closed position in which said interior space is not accessible;

an electric motor housing, wherein the electric motor housing is positioned in the interior space of the housing unit;

an electric motor, wherein the electric motor is positioned on the electric motor housing;

a battery housing, wherein the battery housing is positioned in the interior space of the housing unit;

a switch, wherein the switch is operative connected to the electric motor;

at least one wing member attachment member;

at least one wing member, wherein the at least one wing member is attached to the at least one wing member attachment member;

a drive shaft, wherein the drive shaft is operative connected to the electric motor and the at least one wing member attachment member;

a mounting member; and a coupling member attached to the mounting member and at least one of the motor or the motor housing, and wherein the at least one of the motor or the motor housing is coupled to the mounting member through the coupling member and operationally configured such that when the motor is in operation, the motor will create vibrational effect that will be transferred to the mounting member.

* * * * *